US011133761B2

(12) United States Patent
Roberts

(10) Patent No.: US 11,133,761 B2
(45) Date of Patent: Sep. 28, 2021

(54) MOTOR ARRANGEMENT

(71) Applicant: CMR SURGICAL LIMITED, Cambridge (GB)

(72) Inventor: Paul Christopher Roberts, Cambridge (GB)

(73) Assignee: CMR Surgical Limited, Cambridge (GB)

( * ) Notice: Subject to any disclaimer, the term of this patent is extended or adjusted under 35 U.S.C. 154(b) by 36 days.

(21) Appl. No.: 15/558,346

(22) PCT Filed: Mar. 17, 2016

(86) PCT No.: PCT/GB2016/050748
§ 371 (c)(1),
(2) Date: Sep. 14, 2017

(87) PCT Pub. No.: WO2016/147007
PCT Pub. Date: Sep. 22, 2016

(65) Prior Publication Data
US 2018/0069493 A1    Mar. 8, 2018

(30) Foreign Application Priority Data

Mar. 17, 2015   (GB) .................................... 1504506

(51) Int. Cl.
*H02P 3/24*       (2006.01)
*H02P 6/24*       (2006.01)
(52) U.S. Cl.
CPC . *H02P 3/24* (2013.01); *H02P 6/24* (2013.01)
(58) Field of Classification Search
CPC ...... H02P 3/12; H02P 3/14; H02P 3/16; H02P 3/00; H02P 3/22; H02P 3/26;
(Continued)

(56) References Cited

U.S. PATENT DOCUMENTS 6,005,359 A * 12/1999 Brambilla .............. G11B 19/22
                                               318/368
6,239,566 B1 * 5/2001 Tareilus .................... B60L 7/22
                                               318/379
(Continued)

FOREIGN PATENT DOCUMENTS

CN         1066041        11/1992
CN         1593963         3/2005
(Continued)

OTHER PUBLICATIONS

International Search Report related to PCT/GB2016/050748, dated Jun. 27, 2016 (3 pgs.).
(Continued)

*Primary Examiner* — Bickey Dhakal
(74) *Attorney, Agent, or Firm* — Renner, Otto, Boisselle & Sklar, LLP

(57) ABSTRACT

A motor arrangement comprising: motor having a rotor, a stator, and a plurality of windings mounted on one of the rotor and the stator for acting on the other of the rotor and the stator, and a plurality of inputs coupled to the windings; and control circuit configured to operate in a riving mode in which it dynamically energises the windings via the motor inputs so as to cause the rotor to rotate relative to the stator, the control circuit being further configured to operate in a braking mode in which it continually connects at least a first and a second one of the windings to a common rail to form a closed current path to induce braking of the rotor relative to the stator, wherein the control circuit is configured to enter the braking mode in response to a trigger exogenous to the motor indicative of a fault condition.

21 Claims, 15 Drawing Sheets

(58) Field of Classification Search
CPC ........ H02P 21/0092; H02P 29/04; H02P 3/24; H02P 6/24; H02P 3/06
See application file for complete search history.

(56) References Cited

U.S. PATENT DOCUMENTS

| | | | | |
|---|---|---|---|---|
| 6,452,349 | B1* | 9/2002 | Hahn | H02P 6/16 |
| | | | | 318/400.22 |
| 7,352,144 | B2* | 4/2008 | Kameda | H02M 1/32 |
| | | | | 318/254.2 |
| 7,567,044 | B2* | 7/2009 | Matsuhashi | H02P 3/12 |
| | | | | 188/159 |
| 9,515,581 | B2* | 12/2016 | Ogawa | H02P 3/22 |
| 9,614,466 | B2* | 4/2017 | Usselman | H02P 3/22 |
| 2003/0173919 | A1 | 9/2003 | Altendorf | |
| 2005/0179416 | A1* | 8/2005 | Iribe | B25J 9/1674 |
| | | | | 318/563 |
| 2012/0293102 | A1 | 11/2012 | Kock et al. | |
| 2013/0207581 | A1* | 8/2013 | Aoki | H02P 6/24 |
| | | | | 318/400.21 |
| 2016/0114483 | A1* | 4/2016 | Ishikawa | B25J 9/1641 |
| | | | | 700/254 |
| 2017/0155344 | A1* | 6/2017 | Nishino | G05B 9/02 |
| 2018/0375321 | A1* | 12/2018 | Ehrhart | H02P 6/182 |

FOREIGN PATENT DOCUMENTS

| | | | |
|---|---|---|---|
| CN | 1777016 | 5/2006 | |
| CN | 102448797 | 5/2012 | |
| CN | 102741021 | 10/2012 | |
| GB | 2062380 A * | 5/1981 | ............... H02P 3/14 |
| GB | 2256100 | 11/1992 | |
| JP | 1996-256493 | 5/1998 | |
| JP | 2000102275 | 4/2000 | |
| JP | 2000-253687 | 9/2000 | |
| JP | 2005161469 | 6/2005 | |
| JP | 2011172396 | 9/2011 | |
| WO | 2013/155034 | 10/2013 | |
| WO | 2014031112 | 2/2014 | |

OTHER PUBLICATIONS

Written Opinion of the International Searching Authority related to PCT/GB2016/050748, dated Jun. 27, 2016 (6 pgs.).
Search Report related to GB1504506.5, dated Oct. 23, 2015 (3 pgs.).
Chinese Search Report regarding CN201680016102X Aug. 21, 2019 (3pgs.).
English language summary of a Japanese Office Action regarding JP 2017-548962, dated Sep. 24, 2019 (11pgs.).
Notice of Reasons of Refusal for corresponding Japanese Patent Application No. 2017-548962 dated May 15, 2020.

* cited by examiner

MOTOR ARRANGEMENT

BACKGROUND

This invention relates to a motor arrangement having a driving mode of operation and a braking mode of operation.

In motor-driven equipment there is often a need to brake the motor, either by resisting movement of the motor against an external driving force or by arresting the driving torque of the motor.

As an example, consider the application of a motor arrangement for driving a robotic joint such as a robotic arm. It may be desirable to hold the joint in place so as to prevent any accidental movement of the arm if nudged by another object or due to gravity acting on distal joints of the arm. In the field of surgical robotics for instance, it may be desirable for a robotic arm holding a surgical tool to be held in place so as to prevent any accidental movement of the tool.

Another situation in which it may be desirable to brake the motor may be as part of a safety mechanism in the event of a fault condition, such as a power supply failure. In the case of a robotic arm it may desirable for the motor arrangement to fall into a braked condition so as to inhibit injury if the arm is close to a patient, or even holding a tool that is within a patient, when a fault occurs.

One approach to resist movement of a motor is to include a mechanical brake in the drive train. However, adding a mechanical brake into the drive train of the motor has potential drawbacks such as adding mass to the drive train and increasing power consumption. In certain applications it may also require additional circuitry to control the operation of the brake. There is therefore a need for an improved arrangement for braking a motor.

According to one aspect of the present disclosure there is provided a motor arrangement comprising: a motor having a rotor, a stator, and a plurality of windings mounted on one of the rotor and the stator for acting on the other of the rotor and the stator, each winding having one of its ends coupled to a respective motor input; and a control circuit configured to operate in a driving mode in which it dynamically energises the windings via the motor inputs so as to cause the rotor to rotate relative to the stator, the control circuit being further configured to operate in a braking mode in which it continually couples a first and a second one of the windings to a power source to form a closed current path to induce braking of the rotor relative to the stator. The control circuit may be arranged to continually couple three windings of the motor to the common rail.

The power source may be configured to cause a current to be continually applied between one of the motor inputs and another of the motor inputs to induce braking of the rotor relative to the stator when the control circuit is in braking mode.

The control circuit may comprise: a drive circuit configured to dynamically energise the windings so as to cause the rotor to rotate relative to the stator when the control circuit is in driving mode; and a brake circuit, the brake circuit being configured to be activated when the control circuit is operating in braking mode to cause the first and second windings to be continually coupled to the power source, and further configured to be deactivated when the control circuit is operating in driving mode so as to be decoupled from the motor.

The drive circuit may comprise: a drive-circuit power source comprising a pair of terminals; a series of voltage-controlled switching elements, each arranged for selectively coupling a respective motor input to a respective one of the terminals; and a commutation circuit configured to, when the control circuit is in driving mode, dynamically energise the windings by activating the switching elements to couple each motor input to a selected one of the terminals.

The brake circuit may be configured to, when the control circuit is in the braking mode, activate a subset of the switching elements of the drive circuit to continually couple each of the first and second windings to a selected one of the terminals to induce braking of the rotor relative to the stator.

The brake circuit may be arranged to, when the control circuit is in the braking mode of operation, continually couple a third winding to a selected one of the terminals of the drive circuit.

The brake circuit may comprise control logic configured to output control signals to the subset of switching elements to activate those switching elements to cause the control circuit to switch from driving mode to braking mode.

The control logic may be configured to output control signals to a default subset of switching elements to cause the control circuit to switch from driving mode to braking mode.

The control logic may be configured to, in response to a failure of a voltage-controlled switching element or a winding in braking mode, activate a subset of switching elements different from the default subset of switching elements to continually couple a first and second one of the windings to the power source to form a closed current path to induce braking of the rotor relative to the stator.

The drive-circuit power source may be a voltage supply comprising an upper supply rail and a lower supply rail separated by a supply voltage.

The series of voltage-controlled switching elements of the drive circuit may comprise a series of high-side switching elements to couple each winding to an upper voltage rail of the supply rails, and a series of low-side switching elements to couple each winding to a lower voltage rail of the supply rails, the brake circuit comprising its own voltage supply for use in activating one of the high-side switching elements to continually couple a first one of the windings to the upper voltage rail of the drive circuit when the control circuit is in braking mode.

The voltage supply of the brake circuit may be connected in series with the supply rails of the drive circuit.

The power source may comprise a current source.

The control circuit may comprise a brake circuit comprising a series of voltage controlled switching elements separate from the series of switching elements of the drive circuit, wherein the brake circuit is arranged to, when the control circuit is in the braking mode, activate at least a subset of the switching elements of the brake circuit to continually couple the first and second windings to a power source to form the closed current path to induce braking of the rotor relative to the stator.

The brake circuit may comprise a brake-circuit power source comprising a pair of terminals, the brake circuit being arranged to, when the control circuit is in braking mode, activate the switching elements of the brake circuit to continually couple each of the first and second windings to a selected one of the terminals of the brake-circuit power source to induce braking of the rotor relative to the stator.

The brake circuit may be further arranged to, when the control circuit is in the braking mode of operation, activate the switching elements of the brake circuit to continually couple a third winding to a selected one of the terminals of the brake-circuit power source.

The brake circuit may further comprise control logic configured to output control signals to the brake-circuit switching elements to activate those switching elements.

The control logic may be configured to output control signals to activate all of the brake-circuit switching elements when the control circuit is in braking mode to continually couple the first and second winding to the power source to form the closed current path.

The control logic may be configured to output control signals to activate a default subset of the brake-circuit switching elements when the control circuit is in braking mode to continually couple the first and second winding to the power source to form the closed current path.

The control logic may be configured to, in response to a failure of a brake-circuit switching element or a winding in braking mode, activate a subset of switching elements different from the default subset of switching elements to continually couple a first and second one of the windings to the power source to form a closed current path to induce braking of the rotor relative to the stator.

The brake-circuit power source comprises a pair of supply rails separate from the supply rails of the drive circuit and being separated by a braking supply voltage.

The supply rails of the brake circuit may be arranged in parallel with the supply rails of the drive circuit.

The brake-circuit power source may comprise a current source.

According to a second aspect of the present disclosure there is provided a motor arrangement comprising: a motor having a rotor, a stator, and a plurality of windings mounted on one of the rotor and the stator for acting on the other of the rotor and the stator, each winding having one of its ends coupled to a respective motor input; and a control circuit configured to operate in a driving mode in which it dynamically energises the windings via the motor inputs so as to cause the rotor to rotate relative to the stator, the control circuit being further configured to operate in a braking mode in which it continually directly connects a first and a second one of the windings to a common rail to form a closed current path to induce braking of the rotor relative to the stator.

The control circuit may comprise: a drive circuit configured to dynamically energise the windings so as to cause the rotor to rotate relative to the stator when the control circuit is in driving mode; and a brake circuit, the brake circuit being configured to be activated when the control circuit is operating in braking mode to cause the first and second windings to be continually directly connected to the common rail, and further configured to be deactivated when the control circuit is operating in driving mode so as to be decoupled from the motor.

The drive circuit may comprise: a drive-circuit power source comprising a pair of terminals; a series of voltage-controlled switching elements, each arranged for selectively coupling a respective motor input to a respective one of the terminals; and a commutation circuit configured to, when the control circuit is in driving mode, dynamically energise the windings by activating the switching elements to couple each motor input to a selected one of the terminals.

The brake circuit may comprise a series of voltage controlled switching elements separate from the series of switching elements of the drive circuit, the brake circuit being arranged to, when the control circuit is in braking mode, activate the switching elements of the brake circuit to continually directly connect each of the motor inputs to the common rail to decouple the drive circuit from the motor and form a closed current path to induce braking of the rotor relative to the stator.

The brake circuit may comprise its own voltage supply for activating the switching elements of the brake circuit when the control circuit is in braking mode. The voltage supply may be a capacitor.

The brake circuit may be configured so that the capacitor is charged from the drive-circuit power source when the control circuit is in driving mode.

The capacitor may be configured to discharge when the control circuit is in braking mode.

The voltage controlled switching elements may be MOSFETs.

The control circuit may be configured to enter the braking mode in response to a trigger condition.

The trigger condition may be the reduction of a supply voltage of the control circuit below a predetermined value.

The motor arrangement may comprise a trigger circuit configured to cause the control circuit to enter the braking mode in response to the trigger condition.

The motor arrangement may comprise a trigger circuit configured to activate the brake circuit to cause the control circuit to enter the braking mode in response to a trigger condition.

The trigger circuit may comprise a Zener diode coupled to one of the terminals of the drive-circuit power source, the Zener diode having an associated breakdown voltage, wherein the trigger circuit is configured to cause the control circuit to enter the braking mode of operation when the supply voltage drops below a predetermined voltage so that a voltage across the Zener diode is less than its breakdown voltage.

Alternatively the trigger circuit may rely on a more complex combination of inputs, such as current and historic supply voltages, current and historical states of the voltage controller switching elements, current and historical state of position sensors and/or torque sensors. Such a more complex embodiment would likely require a programmable logic and/or a microprocessor.

The control circuit may comprise a drive circuit configured to dynamically energise the plurality of windings so as to cause the rotor to rotate relative to the stator when the control circuit is in driving mode, the drive circuit comprising a three-phase MOSFET bridge.

According to another aspect of the present disclosure there is provided a motor arrangement comprising: a motor having a rotor, a stator, and a plurality of windings mounted on one of the rotor and the stator for acting on the other of the rotor and the stator, and a plurality of inputs coupled to the windings; and a control circuit configured to operate in a driving mode in which it dynamically energises the windings via the motor inputs so as to cause the rotor to rotate relative to the stator, the control circuit being further configured to operate in a braking mode in which it continually connects at least a first and a second one of the windings to a common rail to form a closed current path to induce braking of the rotor relative to the stator, wherein the control circuit is configured to enter the braking mode in response to a trigger exogenous to the motor indicative of a fault condition.

The brake circuit may comprise a plurality of voltage-controlled switching elements arranged to connect a respective winding to the common rail when the brake circuit is activated.

The brake circuit may further comprise a voltage supply that activates the switching elements to continually connect a respective winding to the common rail when the control circuit is in braking mode. The voltage supply may be a capacitor.

The capacitor may be coupled to the drive circuit and the voltage-controlled switching elements of the brake circuit so that the drive circuit charges the capacitor when the control circuit is in driving mode and the capacitor discharges to activate the switching elements of the braking circuit when the control circuit is in braking mode.

A motor arrangement as claimed in claim 11 or 12, wherein the trigger circuit is operable to receive a heartbeat signal indicating a lack of fault condition detection, and configured to interpret the absence of the heartbeat signal as the trigger.

The trigger circuit may be operable to receive a plurality of heartbeat signals indicating the lack of a respective fault condition, and to interpret the absence of at least one of the heartbeat signals as the trigger.

The fault condition may be exogenous to the motor.

The fault condition may be a fault in one of the motor components. It may be detected in a component external to the motor.

The trigger may be the absence of a signal indicative of a lack of fault condition.

Any of the previous aspects may be implemented in a robotic system comprising a robot having a series of links interconnected by articulated joints. The motor arrangement of any of the previous aspects of the disclosure may be used to drive at least one of the articulated joints of the robot arm.

BRIEF DESCRIPTION OF FIGURES

The present invention will now be described by way of example with reference to the accompanying drawings. In the drawings.

DETAILED DESCRIPTION

Figure 1:
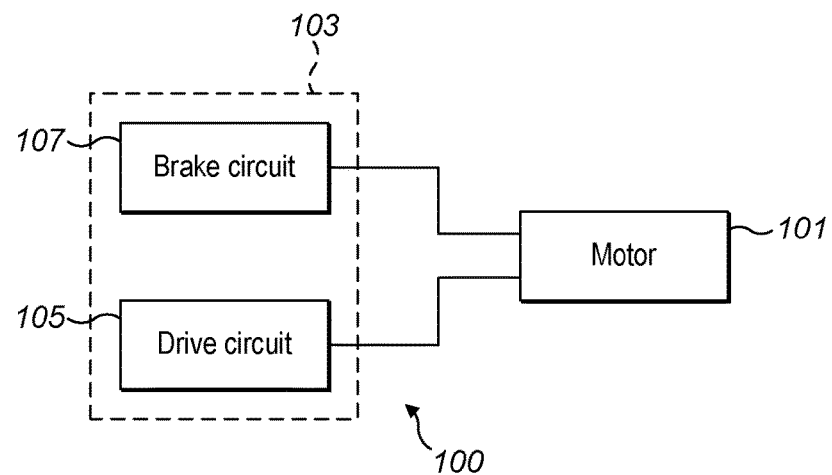
FIG. 1 shows a block diagram of a motor arrangement.

Embodiments of the present invention relate to a motor arrangement comprising a motor having a rotor and a stator and a plurality of windings mounted on one of the rotor or stator for acting on the other one of the rotor and stator. Each winding has one of its ends coupled to a respective motor input. The arrangement further comprises a control circuit having two modes of operation. The first mode is a driving mode in which the control circuit dynamically energises the windings via the motor inputs so as to rotate the rotor relative to the stator. The second mode is a braking mode in which the control circuit continually couples a first and a second one of the windings to a voltage source or a common rail to form a closed current path to induce braking of the rotor relative to the stator.

In motors comprising a rotor and a stator the interaction of the magnetic fields of the rotor and stator cause rotation of the rotor relative to the stator, generating a torque. For many motors, the developed torque may be generated according to the equation:

$$T = IK \sin(\delta) \quad (1)$$

Here I is the current flow through the motor, K is a constant proportional to the radial flux density in the air gap between the rotor and stator, and δ is the angular difference between the magnetic field of the rotor and the magnetic field of the stator. In order to rotate the rotor, a subset of the stator windings may be energised. A stator winding may be energised, or activated, by passing a current through the winding. Applying current through the winding causes a magnetic field to be generated around the winding. As the rotor rotates to align its field with that of the stator a next subset of windings are energised to continue to generate a torque. A subset of windings may include one or more windings. Applying current through the windings with a phase offset between each winding in this manner may be referred to as dynamically energising the windings. Dynamically energising the windings means current may be passed through the windings according to a sequence, i.e. the windings are sequentially activated. Thus by dynamically energising the windings of the stator the rotor can be continuously rotated to drive the motor. Energising the windings in this way may be controlled electronically. Those trained in the art will appreciate that there are many well-known methods of controlling the energisation of the stator winding.

Examples of motors that can be electronically commutated in this manner include, for example, brushless DC motors, switched reluctance motors, stepper motors etc.

In certain applications the peak torque delivery ability of the motor is greater than the maximum required braking torque for that application. Because of this, the motor has the technical capability of itself being used a brake, thereby negating the need for an additional brake in the drivetrain.

A motor arrangement may have a braking mode of operation in which at least two windings are continually coupled to a power source or common rail to form a closed current path, or closed circuit. The power source may be a voltage source, or a current source. The voltage source may be at 0V. The common rail may be earthed. By forming a closed circuit from the power source, the windings coupled to the power source may be continually energised when the arrangement is in the braking mode of operation. By continually coupling the windings to the common rail source the motor is short-circuited which in turn induces braking of the motor. This can provide improvements in the braking operation of a motor for reasons explained below.

Continually coupling windings of the motor to a voltage source to form a closed circuit means that the motor is no longer being electrically commutated and the amplitude of the magnetic field generated by the stator is substantially fixed in angular space. Rotation of the rotor relative to the stator in the presence of such a substantially fixed magnetic field generates a back electromotive force (EMF). This causes a current flow in the windings of the stator in a direction so as to generate a magnetic field that retards the motion of the rotor in accordance with Lenz's law, thereby arresting motion of the rotor. Rotation of the rotor relative to the stator is arrested in a similar manner if the windings are coupled to a voltage source of zero potential. When this happens the magnetic field generated by the stator has zero magnitude, but subsequent rotation of the rotor relative to the stator causes a magnetic field to be generated by the windings in a direction so as to oppose the rotation of the rotor.

The motor may further function as a holding brake to resist rotation of the rotor against an external torque. As an example, consider the situation in which an external load is applied to the motor which generates an external driving torque $T_D$. This torque could be, for example, due to the mass of distal robotic linkage if the motor arrangement were implemented in a robotic joint. If the driving torque $T_D$ is less than the maximum torque $T_{max}$ capable of being generated by the motor when current is applied between the motor inputs in braking mode (i.e. when $\delta=90$ degrees), then the rotor rotates to an equilibrium angle $\delta_E$ in which the torque generated by the motor is equal and opposite to the driving torque $T_D$. The motor arrangement could therefore operate to induce braking of the rotor to both arrest motion of the rotor and to prevent rotation of the rotor against an external torque.

The motor arrangements described in the foregoing may be used within a robotic system. In particular, they may be implemented within a robotic arm. A robotic arm (e.g. a surgical robotic arm) may comprise a series of links interconnected by articulated joints. The joints may permit translational and/or rotational freedom to thereby enable articulation of the arm. The links of the arm may be rigid. The joints of the robotic arm may be driven by motors that apply a joint torque. The motors may form part of any of the motor arrangements described herein.

In the following figures like reference numerals denote like components.

Figure 9:
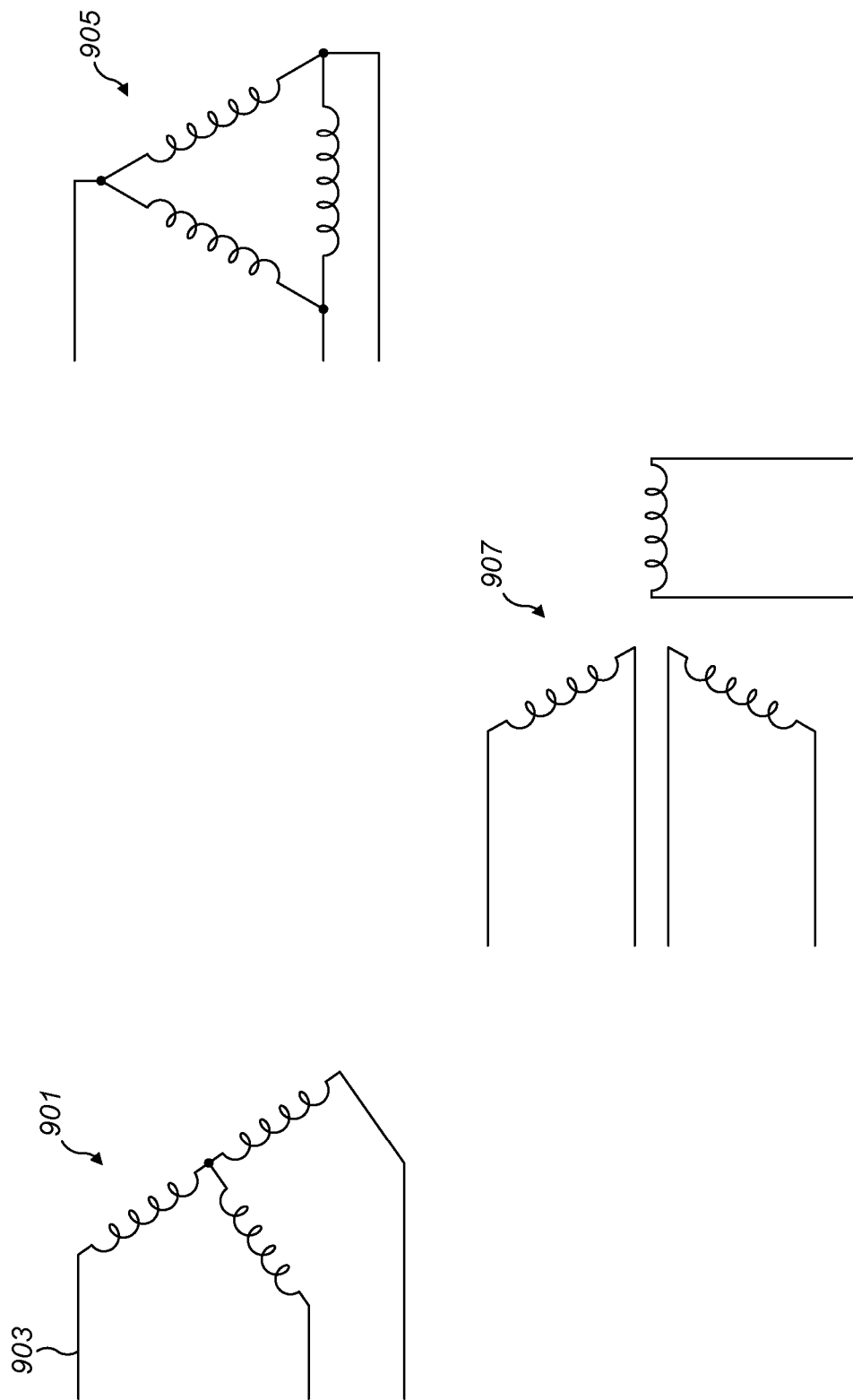
FIG. 9 shows a set of example winding arrangements for the motor.

FIG. 1 is a schematic diagram illustrating a motor arrangement. The motor arrangement 100 comprises a motor 101 and a control circuit, indicated generally at 103. The control circuit comprises a drive circuit and a brake circuit, indicated generally at 105 and 107 respectively. The motor comprises a rotor and a stator and a plurality of windings and a plurality of inputs. In one example, each winding has one of its ends coupled to a respective motor input. In other examples, each end of the winding may be coupled to a motor input. The motor could be any suitable motor that requires electronic commutation to function. The motor could be, for example, a brushless DC motor, a switched reluctance motor, stepper motor etc. The motor may be a three-phase motor, for example in a wye or delta winding arrangement. The motor may be a polyphase motor with more than three windings, or it may be a bi-phase motor etc. Some examples of possible motor windings are shown in FIG. 9. The windings depicted at 901 illustrate a wye arrangement in which each winding has a respective end coupled to a motor input (e.g. input 903). Windings 905 illustrate a delta arrangement. Windings 907 illustrate an arrangement in which each coil can be independently energised. In this winding each end of each coil may be coupled to a motor input. Of course, other winding arrangements are possible.

The control circuit has a driving mode of operation and a braking mode of operation. In the driving mode of operation the control circuit dynamically energises the windings via the motor inputs to cause the rotor to rotate relative to the stator. The energisation of the windings in driving mode is controlled by the drive circuit 105. The drive circuit 105 may comprise a bridge circuit such as an H-bridge, a three-phase bridge etc. The drive circuit may comprise a drive-circuit power source to dynamically energise the windings when the control circuit is in driving mode. The drive-circuit power source may be a voltage source and/or a current source.

In a first set of examples, in the braking mode of operation the control circuit is configured to cause a first and second one of the windings to be continually coupled to a power source to form a closed current path. The closed current path is a path through which a current flows provided there is a suitable electric potential, and includes the power source and the windings coupled to the power source. By forming a closed circuit which includes the power source and the windings coupled thereto, braking of the rotor relative to the stator may be induced. Each of the windings may be coupled to the same power source. The power source may form part of the drive circuit (for example it may be the power source used to energise the windings in driving mode). Alternatively the power source may form part of the brake circuit. It may be coupled to the motor independently of the mode of operation of the control circuit. The windings may be coupled to more than one power source, for example a power source in the drive circuit and a power source in the brake circuit. The power source may be a voltage source or a current source. The power source may be voltage source at zero potential.

Continually coupling a first and second winding to the power source when in braking mode may increase the insensitivity of the motor arrangement to winding failure. For example, if one of the windings that is coupled to the power source fails, the power source may still cause the remaining coupled winding(s) to be energised and thus enable the motor to operate as a brake.

In another set of examples, in the braking mode of operation the control circuit causes at least a first and second winding of the motor to be coupled to a common rail to thereby form a closed current path to induce braking of the rotor relative to the stator. The control circuit may be configured to enter the braking mode in response to a trigger exogenous to the motor that is indicative of a fault condition. That is, the fault is detected outside of the motor, but the fault itself may or may not be exogenous to the motor. For example, the fault may be detected in a component not forming part of a motor, or the value of a parameter may be sensed externally of the motor or in a component external to the motor but the actual component fault may be a motor component.

Figure 2A:
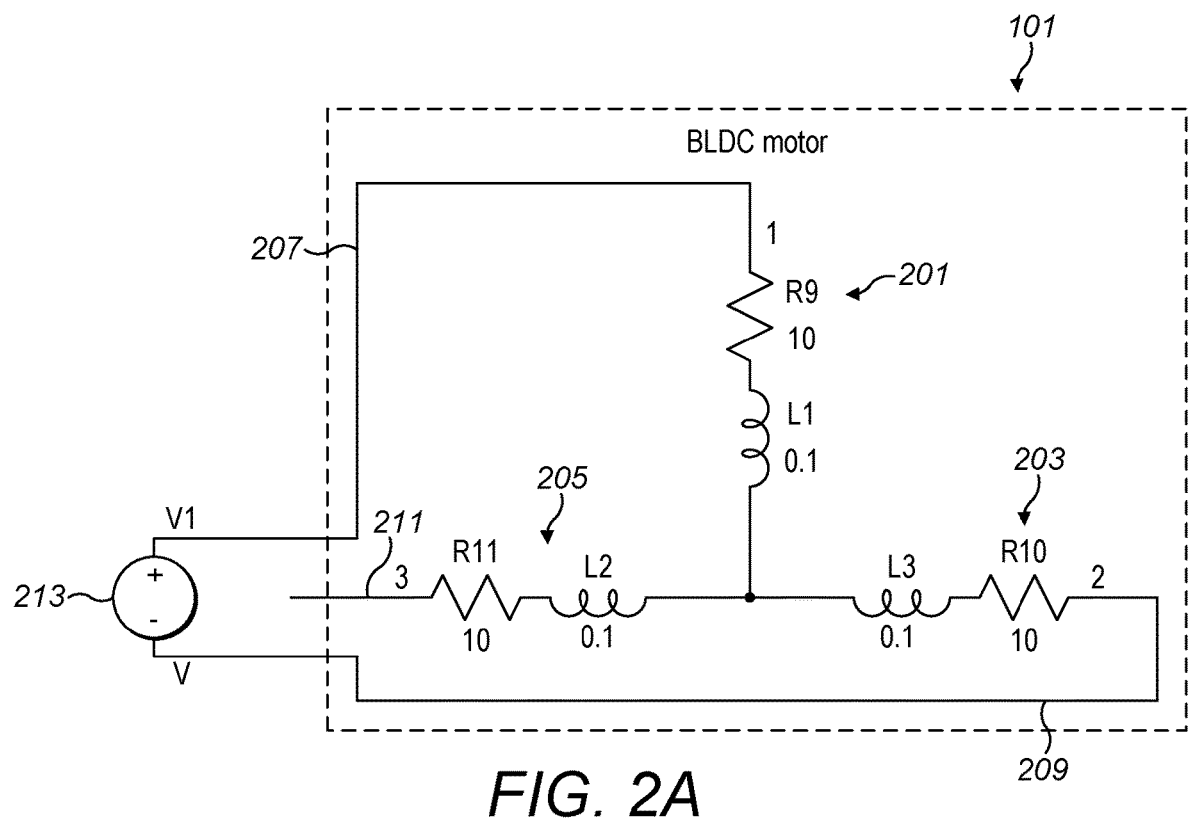
FIG. 2A shows an example of the coupling of a motor to a power source during a braking mode
Figure 2B:
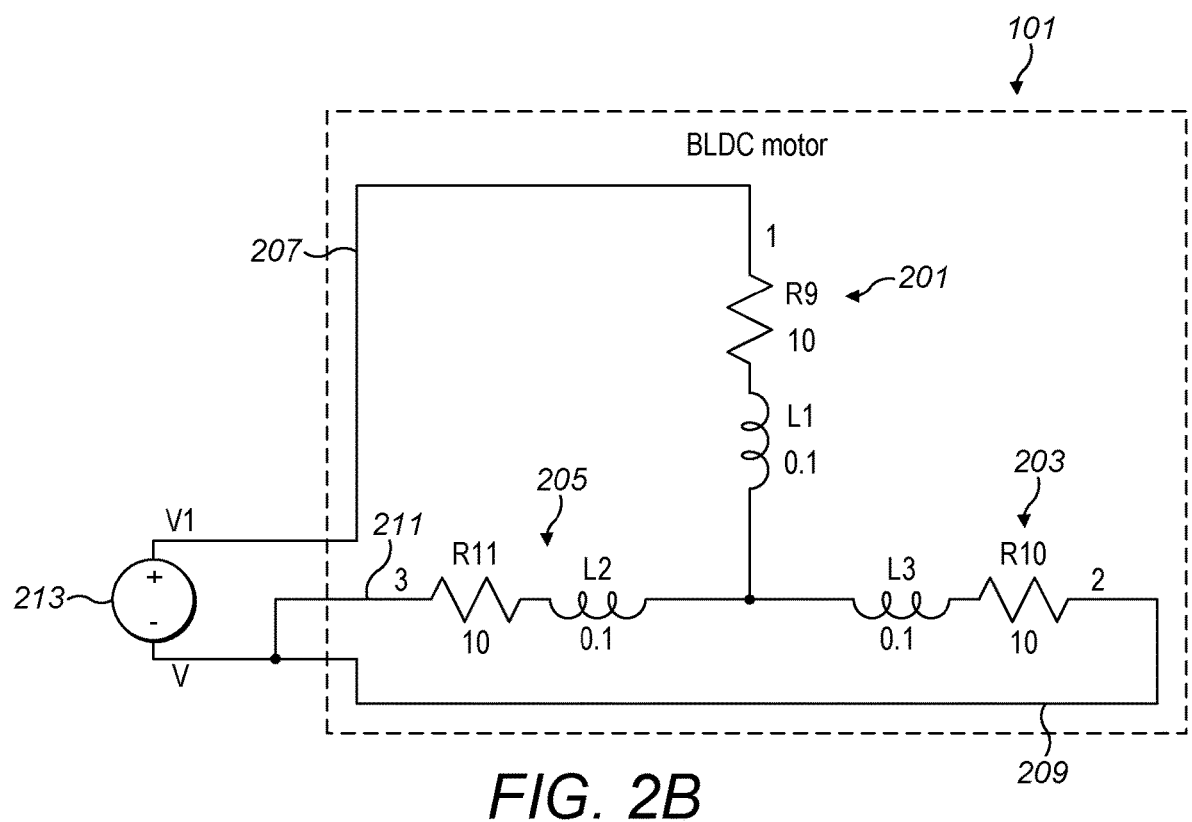
FIG. 2B shows another example of the coupling of a motor to a power source during a braking mode.

FIGS. 2A and 2B illustrate two examples of how the motor windings may be coupled to a power source when the control circuit is operating in braking mode. In these examples the power source is a voltage source. In both of these examples the motor 101 is a three-phase motor with the windings in a wye arrangement. It is to be understood that this is for the purposes of illustration only, and that other winding arrangements are possible (e.g. one of the windings shown in FIG. 9), and the power source may equally be a current source.

As shown, the motor 101 comprises a first winding 201, a second winding 203 and a third winding 205. The motor further comprises a number of inputs 207, 209 and 211 coupled to the windings. Specifically, in this example each winding 201, 203 and 205 has one of its ends coupled a respective motor input. In FIG. 2A the first and second windings are coupled to a voltage source 213. The third winding is disconnected from the voltage source. Under the single fault condition of a failure in the third winding 205, the ability of the motor arrangement to induce braking of the rotor relative to the stator is unchanged. In the event that there is a fault in the first or second windings, the induced braking of the motor can remain unchanged by coupling the third winding to the voltage source in place of the failed winding. The third winding may be coupled to the voltage source via a switching arrangement capable to connecting the winding to either terminal of the voltage source. The switching arrangement may be operate to connect the third winding to the voltage source in response to a control signal from a control circuit. The third winding may be coupled to the voltage source in response to detecting that there is fault in the first or second windings. A fault in the windings may be detected by measuring the current through the windings, for example.

In FIG. 2B, each of the windings is coupled to the voltage source: winding 201 is coupled to the positive terminal, or rail, of the voltage source via its motor input 207, and windings 203 and 205 are coupled to the negative terminal, or rail, of the voltage source via their respective motor inputs 209 and 211. In the event of the single fault condition of either winding 203 or 205 failing, the ability of the motor arrangement to induce braking of the motor is substantially unchanged. For example, if winding 203 fails, a closed circuit remains which includes the voltage source and windings 201 and 205; if winding 205 fails a closed circuit which includes the voltage source and windings 201 and 203 remains. Similarly to the arrangement of FIG. 2A, a failure in winding 201 would require that one of the remaining windings be coupled to the voltage source in its place. This may be done via a switching arrangement similar to that described in relation to FIG. 2A.

The control circuit operates in braking mode by engaging the brake circuit. The brake circuit may be engaged automatically in response to a trigger. The trigger may be indicative of a fault condition. The trigger may be exogenous to the motor, i.e. the indication of the fault may be detected externally of the motor. The fault condition itself may be exogenous of the motor. For example, the brake circuit may be configured to engage automatically to cause the control circuit to switch from driving mode to braking mode in response to detecting that the voltage supplied to the motor from the drive circuit drops below a predetermined value. This may be useful as a safety feature, for example if the motor arrangement were implemented in a surgical robotic arm. Various other trigger conditions (i.e. not indicative of a fault condition) may be used to switch operation of the control circuit from driving mode to braking mode. One class of such trigger conditions may be manual operations performed by a user, for example actuation of a button, lever or some other safety control system. Alternatively the trigger condition may be detection by a motion sensor. For example, if the motor arrangement were implemented in machinery, a motion sensor may be employed to detect the presence of a person, and in response cause the control circuit to operate in braking mode. This may be a useful safety feature to prevent a person from injuring themselves on moving parts of a machine, or if the motor arrangement were implemented in a surgical robotic arm, to prevent unwanted or accidental movement of the arm.

The motor arrangement may comprise circuitry which enables the brake circuit to be engaged even in the event of a loss of power in the drive circuit, for example in the event the power source of the drive circuit fails. This circuitry may comprise a battery. Alternatively, or in addition, it may comprise a capacitor for supplying a voltage to engage the brake circuit. This circuitry may form part of the brake circuit, as will be described in more detail below.

The motor arrangement may contain control logic to control the coupling of the windings to the voltage source when the control circuit is in braking mode. The control logic may be in the form of a series of voltage-controlled switching elements, for example MOSFETS. The control logic may form part of the brake circuit. The control logic may be configured to control the drive circuit so as to cause a plurality of the motor windings to be continually coupled to the power source or the common rail during braking mode. For example, the drive circuit may comprise a series of switching elements for dynamically energising the windings of the motor when in driving mode. The control logic may be configured to control these same switching elements of the drive circuit to cause at least two of the motor windings to be continually coupled to the power source during braking mode. That is, the control logic may be configured to control the switching elements of the drive circuit to implement the braking function when the control circuit is in braking mode.

Alternatively, the brake circuit may comprise additional circuitry for coupling a plurality of the windings to a power source or common rail when in braking mode. The additional circuitry may be in the form of a series of switching elements separate from the switching elements of the drive circuit. The additional circuitry may operate to decouple the drive circuit from the motor when the control circuit is in braking mode.

In the following, various examples of the motor arrangement 100 are described. In the following examples, the power source continually coupled to the motor windings when the control circuit is in braking mode is a voltage source. This is for the purpose of illustration only and it will be understood that the power source may take various forms. The power source could for example be a current source. It will also be understood that these embodiments are examples only and that various other modifications may be made within the scope of the claims.

Figure 3:
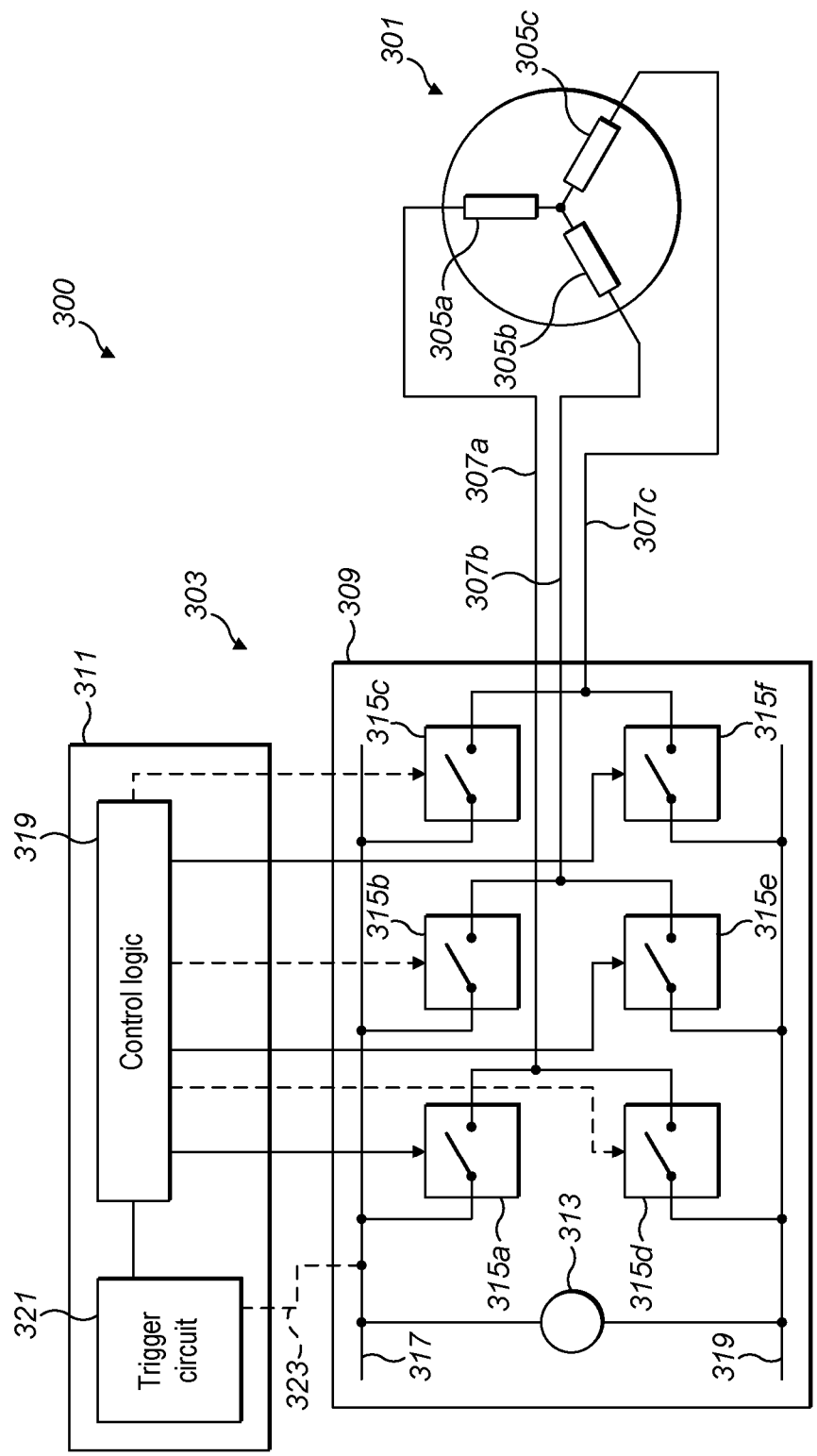
FIG. 3 shows a schematic diagram of a motor arrangement in which a brake circuit controls a drive circuit to couple motor windings to a power source during a braking mode.

An example of the motor arrangement 100 is shown in FIG. 3 in schematic form. FIG. 3 shows a motor arrangement 300 comprising a motor, indicated generally at 301, and a control circuit, indicated generally at 303. In this example the motor is a three-phase motor in a wye winding arrangement. The motor 301 comprises three windings $305_a$, $305_b$ and $305_c$. The motor further comprises three inputs $307_{a,b,c}$ coupled to the windings. Here, each winding has one of its ends coupled to a respective motor input $307_a$, $307_b$ and $307_c$.

The control circuit comprises a drive circuit 309 and a brake circuit 311. The drive circuit comprises a drive-circuit power source 313. The drive circuit further comprises a series of voltage-controlled switching elements $315_{a-f}$ arranged in a three-phase bridge arrangement. Switching elements $315_{a-c}$ are high-side switching elements for coupling respective motor inputs $307_{a-c}$ to upper supply rail 317. Switching elements $315_{d-f}$ are low-side switching elements for coupling respective motor inputs $307_{a-c}$ to lower supply rail 319. Switching elements $315_{a-f}$ could be, for example, FETs (e.g. N-MOSFETS), bi-polar transistors, TRIACS, SCRS, IGBTs, SiC based devices etc.

The brake circuit comprises control logic 319 and a trigger circuit 321. The control logic is configured to control the coupling of the motor windings to the drive-circuit power source when the control circuit operates in braking mode. The control logic is configured to provide control signals to a selection, or subset, of the switching elements of the drive circuit to selectively couple each of the motor inputs to one of the supply rails. In the example shown in FIG. 3, control signals are input to switching elements $315_a$ and $315_{e,f}$, shown by the solid lines. The control logic is coupled to a trigger circuit 321. The trigger circuit is configured to cause the control logic to output the control signals in response to a trigger condition. The trigger circuit may be coupled to the drive circuit, as indicated by the dashed line 323.

The brake circuit may comprise its own voltage supply (not shown) for powering the control logic to generate the control signals to activate the switching elements $315_{a,b,c}$. This power supply can be independent of the drive-circuit power source to enable the control circuit to engage the brake circuit to transition to braking mode independently of the operation of the drive-circuit power source (for example in the event the drive-circuit power source fails).

The control circuit of the motor arrangement is configured to operate in both a driving mode and a braking mode. In driving mode the brake circuit is decoupled from the drive circuit and the switching elements of the drive circuit are driven by a commutation circuit (not shown). The commutation circuit sends control signals on each of the drive inputs to cause each switching element $319_{a-f}$ to adopt a closed configuration or an open configuration. By activating the switches in this manner the terminals of the drive-circuit power source can cause a current to be applied between one of the motor inputs and another of the motor inputs to cause windings of the motor to be energised.

For example, if switching element $319_a$ and $319_f$ are closed and the remaining switches are open, motor input $307_a$ is coupled to the upper supply rail and input $307_c$ is coupled to the lower supply rail. A current is therefore applied between these two inputs thereby energising windings $305_a$ and $305_c$.

The commutation circuit can dynamically energise the windings of the motor by selectively activating switching elements $319_{a-f}$ to couple the motor inputs to one of the terminals of the drive-circuit power source. By dynamically activating the gates in this manner the rotor can be continually rotated with respect to the stator.

When the control circuit is in driving mode, no control signals are input to the drive circuit from the control logic.

When the control circuit is in braking mode, the brake circuit is coupled to the drive circuit so as to cause a plurality of motor windings to be continually coupled to the drive-circuit power source to form a closed current path to induce braking of the rotor relative to the stator. Coupling the windings to the drive-circuit power source to form a closed current path may result in a current being continually applied between one of the motor inputs and another of the motor inputs. By continually applying current between inputs of the motor when in braking mode, selected windings of the motor are continually energised (i.e. the motor is not being electrically commutated).

To continually couple the windings to the drive-circuit power source, selected switching elements 315 of the drive circuit are activated by the control logic so as to continually couple respective selected motor inputs to the supply rails of the drive circuit. In the arrangement shown in FIG. 3, switching elements $315_{a,e,f}$ are activated to continually couple motor input $307_a$ to the upper supply rail and motor inputs $307_{b,c}$ to the lower supply rail. Thus in this example, the control logic activates switching elements of the drive circuit to induce braking of the rotor relative to the stator when the control circuit is in braking mode.

The control circuit may be configured to enter the braking mode in response to a trigger condition. The trigger condition may be detected by the trigger circuit 321. The trigger circuit may be configured to output a signal to the control logic to activate the selected switching elements of the drive circuit in response to the trigger condition to cause the control circuit to switch to braking mode. The trigger condition may be indicative of a fault condition. The trigger may be exogenous of the motor so that the detection of the fault indication is outside of the motor. That fault condition may be a fault in an external component of the motor, but it may be a fault in a motor component (though detected externally of the motor). In one example, the trigger condition may be that the supply voltage provided by the drive circuit drops below a predetermined value, i.e. the fault condition (failure of the supply voltage) is exogenous to the motor.

Switching to the braking mode automatically in response to the supply voltage of the drive circuit dropping below a predetermined value may have the advantage of arresting motion of the rotor in response to a power failure of the drive circuit. This may be a particularly useful safety feature. For example, if the motor arrangement were implemented in a surgical robotic arm it would be highly undesirable for the arm to move freely about a joint in the event of a power failure. By causing the control circuit to enter the braking mode in response to a drop in the main supply voltage, the arm would advantageously be held in position.

The control logic may optionally be configured to provide control signals to one or more pairs of high-side and low-side switching elements. The control logic may be capable of providing control signals to 5 of the 6 switching elements of the drive circuit. The control logic may be capable of providing control signals to all of the low-side switching elements. The control logic may be capable of providing control signals to all but one of the high-side switching elements. For example, the control logic may be configured to provide control signals to switching elements $315_{b,d}$ (as shown by the dashed lines) in addition to the control signals provided to switching elements $315_{a,e,f}$. Providing these additional control signals allows the control circuit to be entirely single fault tolerant in the event one of the switching elements or motor windings fails (provided the control logic itself is single fault tolerant).

The control circuit may be configured so that in braking mode a selection of the brake-circuit switching elements are activated by default and the remaining switching elements are not activated (that is are in an open configuration). The switching elements that are activated by default may be $315_{a,e,f}$ for example. The control logic may be configured to alter the subset of brake-circuit switching elements that are activated in response to one of the switching elements or motor windings undergoing failure to ensure that at least two of the motor windings remain coupled to the power source to form a closed current path.

For example, if switching element $315_a$ were to fail, the control logic could respond by activating switching elements $315_d$ and $315_b$ and de-activating switching element $315_e$. This switches the coupling of motor input $307_a$ from the upper power rail to the lower power rail and switches the coupling of motor input $317_b$ to the upper supply rail from the lower supply rail. Similarly, if motor winding $305_a$ were to fail, the control logic could respond by activating switching elements $315_{b,d}$ and de-activating switching elements $315_{a,e}$ to ensure that windings $305_{b,c}$ remain coupled to the power source to form a closed current path.

Alternatively, the control logic may be capable of providing control signals to all of the switching elements (i.e. all of the high-side switching elements and all of the low-side switching elements. Although being able to supply control signals to all switching elements is not necessary in order to achieve single fault tolerance (as illustrated by the above example), it may provide a selection of alternative winding connections should one of the switching elements fail. For example, referring back to the example situation in which switch $315_a$ or winding $305_a$ fails, the control logic could ensure at least two of the motor windings remain coupled to the power source to form a closed current path by either: i) activating switching elements $315_d$ and $315_b$ and de-activating switching element $315_e$ (as above); or ii) activating switching element $315_d$ and $315_c$ and de-activating switching element $315_f$. This latter arrangement switches the coupling of motor input $307_a$ from the upper power rail to the lower power rail and switches the coupling of motor input $305_c$ from the lower power rail to the upper power rail. This ensures that windings $305_{b,c}$ remain coupled to the power source to form a closed current path. Enabling the control logic to provide control signals to all the switching elements advantageously makes the control circuit double fault tolerant in respect of the switching elements (i.e. any two of the switching elements $315_{a-f}$ can fail whilst still being able to activate a subset of the remaining switching elements so that at least two of the motor windings are coupled to the power source to form a closed current path).

Thus the control logic can respond to the failure of a switching element by re-configuring or switching the coupling of the motor inputs to the supply rails of the drive circuit so that the motor windings remain coupled to the power source to form a closed current path.

Figure 4:
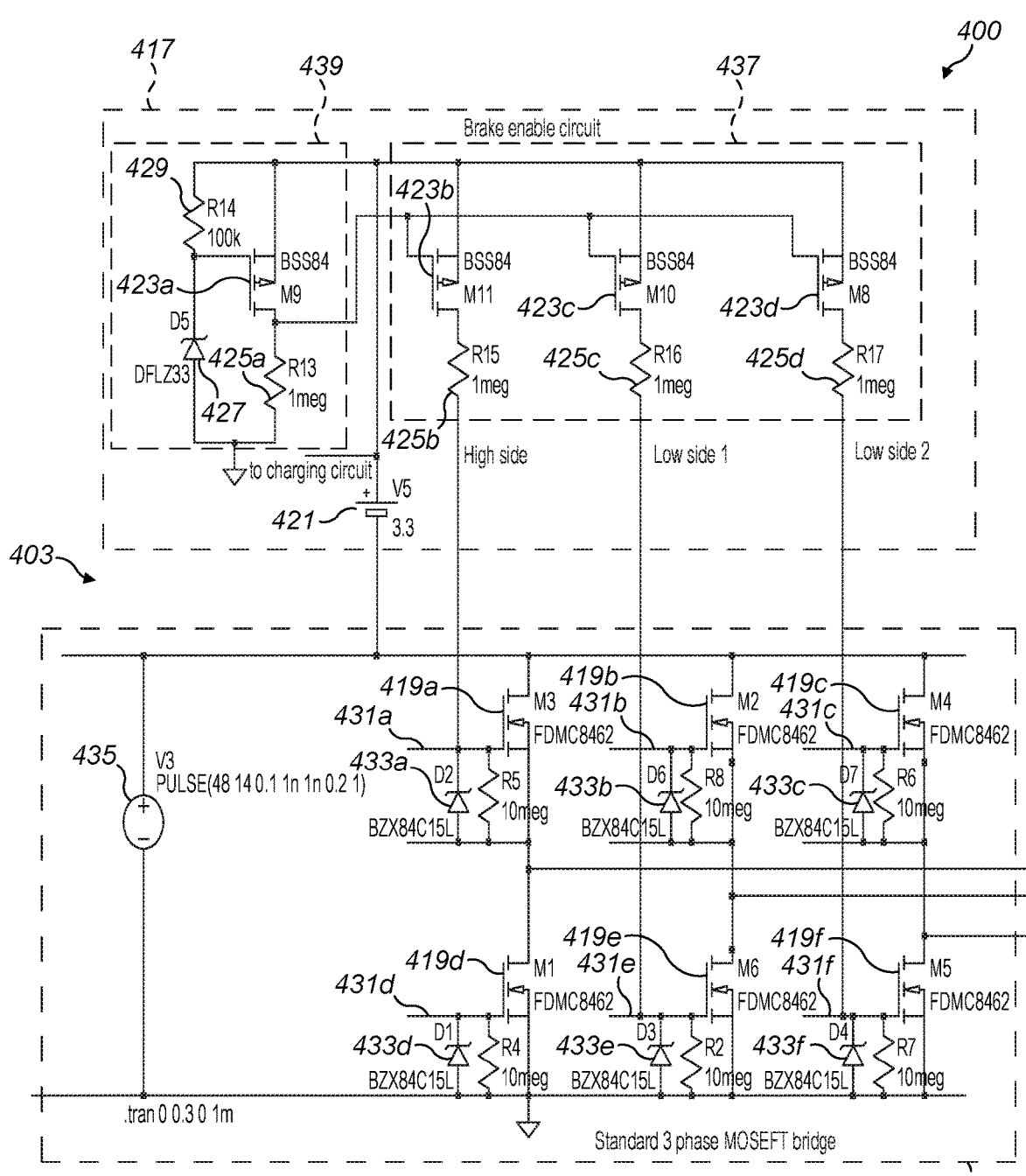
FIG. 4 shows a circuit diagram of a motor arrangement in which a brake circuit controls a drive circuit to couple motor windings to a power source during a braking mode.
Figure 4:
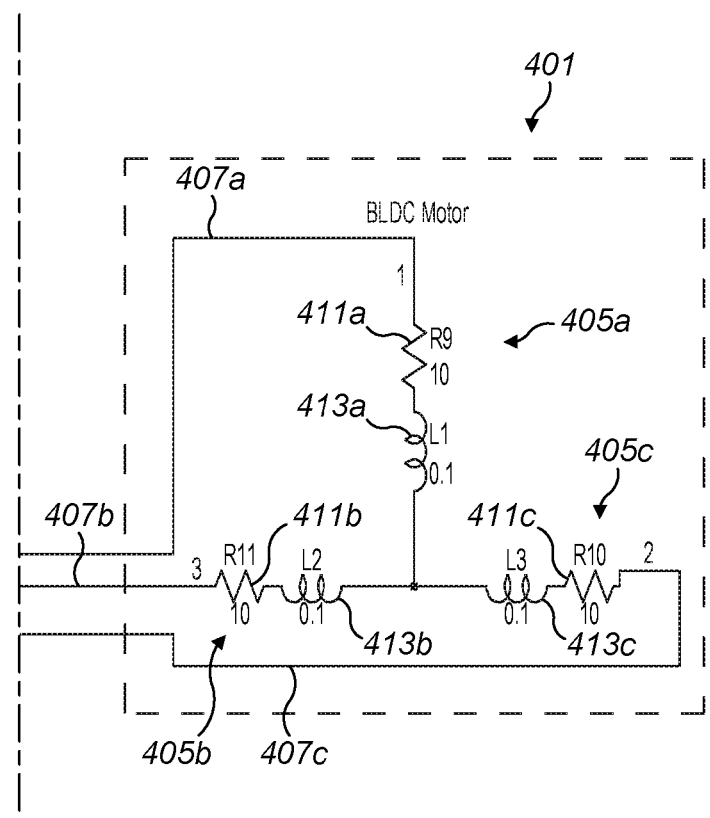

FIG. 4 shows an example implementation of the motor arrangement 300 depicted in FIG. 3. FIG. 4 shows a motor arrangement 400 comprising a motor, indicated generally at 401, and a control circuit, indicated generally at 403. In this example the motor is a three-phase motor in a wye winding arrangement. The motor 401 comprises three windings $405_a$, $405_b$ and $405_c$. Each winding has one of its ends coupled to a respective motor input $407_a$, $407_b$ and $407_c$. Each winding has an associated resistance and an inductance, as depicted schematically in the figure by resistors $411_{a,b,c}$ and inductors $413_{a,b,c}$. The motor further comprises a rotor (not shown) that is operable to rotate with respect to the stator (also not shown). The windings are capable of being mounted on one of the rotor and the stator for acting on the other one of the rotor and stator.

The control circuit comprises a drive circuit 415 and a brake circuit 417. The drive circuit 415 comprises a drive-circuit power source 435. The drive-circuit power source is a voltage supply that comprises terminals separated by a supply voltage $V_3$. In this example the terminals of the power source are in the form of supply rails. The drive circuit comprises a series of voltage-controlled switching elements $419_{a-f}$ arranged in a three-phase bridge arrangement. In this arrangement the switching elements are arranged in three parallel sets, each set comprising two switching elements connected in series between the supply rails. In this example the switching elements $419_{a-f}$ are N-MOSFETs. However, this is for the purpose of illustration only and it will be appreciated by those skilled in the art that a number of alternate switching devices may be used such as, for example: FETs (e.g. N-MOSFETs), bi-polar transistors, TRIACS, SCRS, IGBTs, SiC based devices etc.

The drain of each of switching elements $419_{a,b,c}$ is connected to the upper supply rail of the drive circuit and the sources are connected to the drain of switching elements $419_{d,e,f}$ respectively. The sources of elements $419_{d,e,f}$ are connected to the lower supply rail of the drive circuit. The switching elements are coupled to the motor inputs to enable selective coupling of a motor input to one of the supply rails. As shown, the source of switching element $419_a$ and the drain of element $419_d$ is connected to a first motor input $407_a$; the source of switching element $419_b$ and the drain of element $419_e$ is connected to a second motor input $407_b$; and the source of element $419_c$ and the drain of element $419_f$ is connected to a third motor input $407_c$.

The drive circuit further comprises a number of drive inputs $431_{a-f}$ that drive the respective gates of switching elements $419_{a-f}$. The drive inputs comprise three high-side inputs to drive the gates of high-side switching elements $419_{a,b,c}$, and three low-side inputs to drive the gates of low-side switching elements $419_{d,e,f}$. The drive inputs are coupled to a commutation circuit (not shown) to dynamically energise the windings $405_{a-c}$ to electrically commutate the motor. The commutation circuit is operable to activate the switching elements to selectively couple a respective motor input to a respective one of the terminals of the drive-circuit power source.

Each switching element 419 may optionally be connected to a respective Zener diode $433_{a-f}$ to protect the gates of the MOSFETs. It will be understood that the use of these Zener diodes is optional and may depend on, for example, the voltages and MOSFETs chosen for a particular implementation.

The brake circuit comprises a voltage supply 421. The voltage supply 421 is connected in series to the supply rails of the drive circuit for supplying a voltage $V_5$ to an upper supply rail which is held at voltage level $V_3+V_5$. The braking circuit also comprises control logic indicated generally at 437. The control logic operates to control the coupling of the motor windings to the drive-circuit power source when the control circuit operates in a braking mode. The control logic comprises a number of switching elements $423_{b,c,d}$.

The brake additionally comprises a trigger circuit, indicated generally at 439. The trigger circuit comprises a switching element $423_a$ connected in parallel to a Zener diode 427. The trigger circuit further comprises a resistor 429 connected in series with the diode. The other end of the resistor is connected to the upper supply rail. The gate of switching element $423_a$ is driven by a node positioned between the resistor and the Zener diode.

Each switching element of the brake circuit is connected to the upper supply rail and connected in series with a respective resistor $425_{a,b,c,d}$. As shown, each switching element 423 is arranged so that its source is connected to the upper supply rail of the brake circuit and its drain connected to its respective resistor. The switching elements are further arranged so that switching element $423_a$ of the trigger circuit is connected to each of switching elements $423_{b,c,d}$ of the control logic, which are arranged in parallel. In this example, the switching elements are arranged so that the drain of switching element $423_a$ drives the gates of switching elements $423_{b,c,d}$. The trigger circuit and control logic are arranged so that the logical state of switching element $423_a$ (i.e. whether the switch is open or closed) controls the logical states of switching elements $423_{b,c,d}$.

The braking circuit is coupled to the drive circuit via switching elements $423_{b,c,d}$ of the control logic. The drain of switching element $423_b$ is connected (via resistor $425_b$) to a high side input to activate switching element $419_a$ in the drive circuit. The drains of switching elements $423_c$ and $423_d$ are connected (via resistors $425_c$ and $425_d$ respectively) to respective low-side inputs to activate switching elements $419_e$ and $419_f$ respectively.

Resistor 429 may be configured to have a resistance that is substantially less than that of resistors $425_{a-d}$. In the example shown resistor 429 has a resistance of 100 k Ohms and resistors 425 have a resistance of 1 M Ohms. It will be understood that this is for the purposes of illustration only and that any suitable resistances can be used for the resistors of the motor arrangement.

In this example the switching elements of the brake circuit are in the form of P-MOSFETs. It will be understood that this is for the purposes of example only and that any suitable switching device may be used where the state of the switch is determined by a control voltage relative to the high side voltage.

The control circuit 403 is configured to operate in both a driving mode of operation and a braking mode of operation. In the driving mode of operation the brake circuit is decoupled from the drive circuit and the motor so that the switching elements 419 of the drive circuit are controlled only by the commutation circuit. To decouple the brake circuit from the drive circuit the switching elements $423_{b,c,d}$ adopt an open configuration. In this example the switching elements 423 are P-MOSFETs and so adopt an open configuration when the gate is pulled high by the upper supply rail of the brake circuit. Thus in the arrangement shown the elements $423_{b,c,d}$ adopt an open configuration when switching element $423_a$ is in a closed configuration.

When the control circuit is in driving mode the commutation circuit sends control signals on each of the drive inputs to cause each switching element $419_{a-f}$ to adopt a closed configuration or an open configuration. The commutation circuit can dynamically energise the windings of the motor by selectively activating switching elements $419_{a-f}$ to couple the motor inputs to one of the terminals of the drive-circuit power source. By dynamically activating the gates in this manner the rotor can be continually rotated with respect to the stator.

When the control circuit is in braking mode the brake circuit is coupled to the drive circuit so as to cause a plurality of motor windings to be continually coupled to the drive-circuit power source to form a closed current path to induce braking of the rotor relative to the stator. Coupling the windings to the voltage source to form a closed current path may result in a current being continually applied between one of the motor inputs and another of the motor inputs. To continually couple the windings to the power source 435, selected switching elements 419 of the drive circuit are activated by the control logic so as to continually couple selected motor inputs to the supply rails of the drive circuit.

To couple the brake circuit to the drive circuit, the switching elements $423_{b,c,d}$ of the brake circuit adopt a closed configuration. This causes the gates of the selected switching elements $419_{a,b,c}$ to be pulled high by the upper supply rail of the brake circuit. This in turn activates the selected switching elements of the drive circuit to thereby couple each motor input to one of the supply rails of the drive circuit.

In this example, the switching elements of the drive circuit are N-MOSFETS. It is appreciated that to switch on the high side switching elements of the drive circuit (elements $419_{a-c}$), a high side driver is required. The high side driver drives the gate of the high-side switching element with a voltage that is greater than the supply voltage of the switching element (which in this case is voltage $V_3$) by an amount equal to the element's gate threshold voltage. The power source 421 of the brake circuit supplies part of this high side driver voltage (the other part of the voltage being supplied by the power source 435). The power source 421 therefore functions in part to drive the high-side switching element $419_a$ of the drive circuit to engage the brake circuit.

The power source 421 may further function to enable the brake circuit to engage the drive circuit to induce braking of the motor independently of the power source of the drive circuit. This means that the brake circuit can be engaged without power in the drive circuit. This functionality can be achieved because the supply voltage of the switching element $419_a$ is provided by the power source of the drive circuit, whereas the voltage driving the gate is provided by both the power source of the drive circuit and the power source of the brake circuit. The voltage supplied by the power source of the brake circuit therefore causes the gate of switching element $419_a$ to be driven by a voltage greater than the supply voltage by the gate threshold voltage independently of the value of the voltage supplied by the drive circuit.

It may be desirable for the commutation circuit to be disabled during braking mode so that the remaining switching elements $419_{b,c,d}$ not activated by the brake circuit are off, or in an open configuration. If the commutation circuit is disabled in the braking mode the motor arrangement of FIG. 4 is functionally equivalent to the circuit shown in FIG. 2B, with the voltage source 213 supplying a voltage equal to $V_3$. The motor arrangement may comprise additional logic to coordinate the engaging of the brake circuit with disabling of the commutation circuit. This coordination logic may be configured to automatically disable the commutation circuit in response to the brake circuit being engaged.

The control circuit 403 may be configured to enter the braking mode in response to a trigger condition. In one example, the trigger condition may be that the supply voltage provided by the drive circuit drops below a predetermined value. Thus here the trigger condition is indicative of a fault condition. The switching in operation between the driving mode and the braking mode may be controlled by the trigger circuit 439.

When the motor arrangement 400 is in drive mode, the voltage $V_3$ supplied by the drive circuit is greater than a predetermined value so that the voltage across the Zener diode 427 is greater than its breakdown voltage, thereby allowing current to flow to ground. The gate of switching element $423_a$ is therefore pulled to ground, closing the switch. This in turn means the gates of switching elements $423_{b,c,d}$ are pulled high to the upper supply rail of the brake circuit, causing each of these switching elements to adopt an open position to thereby decouple the brake circuit from the drive circuit as described above.

When the supply voltage $V_3$ drops below the predetermined value, the voltage across the Zener diode is less than its breakdown voltage, thereby pulling the gate of switching element $423_a$ high and opening the switch. This in turn causes the gates of switching elements $423_{b,c,d}$ to be pulled to ground through resistor $425_a$. Pulling switching elements $423_{b,c,d}$ to ground closes these switches to thereby couple the brake circuit from the drive circuit as described above. The trigger circuit 439 thus operates to cause the control logic to activate selected switching elements of the drive circuit in response to the drive-circuit supply voltage dropping below a predetermined value.

Switching to the braking mode automatically in response to the supply voltage of the drive circuit dropping below a predetermined value may have the advantage of arresting motion of the rotor in response to a power failure of the drive circuit. This may be a particularly useful safety feature. For example, if the motor arrangement were implemented in a surgical robotic arm it would be highly undesirable for the arm to move freely about a joint in the event of a power failure. By causing the control circuit to enter the braking mode in response to a drop in the main supply voltage, the arm would advantageously be held in position.

It will be apparent that the Zener diode chosen and the value of the predetermined voltage are design implementations that may be chosen freely depending on the implementation of the motor arrangement and in dependence on, among other things, the maximum value of the supply voltage, the chosen resistances of the resistors etc.

Figure 5:
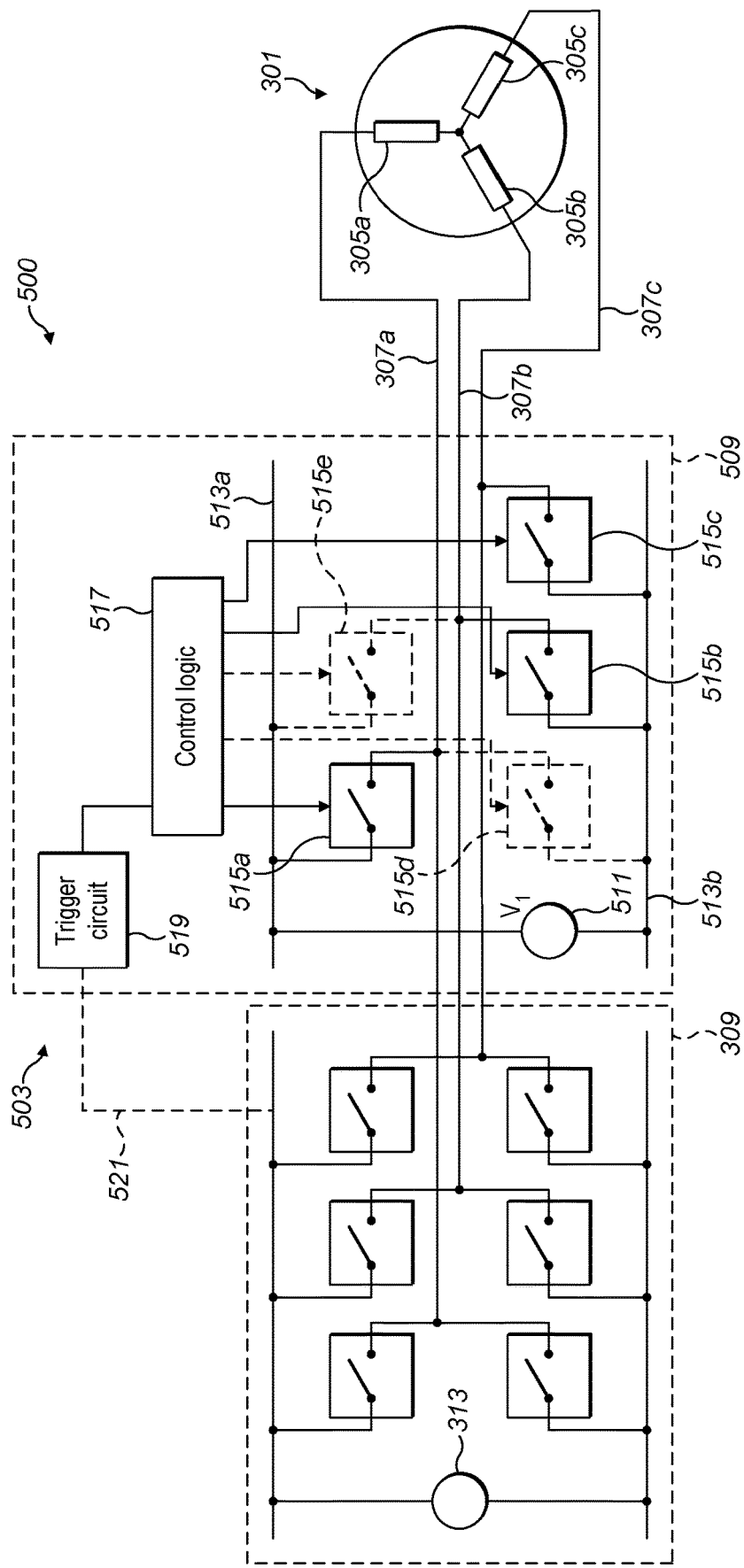
FIG. 5 shows a schematic diagram of a motor arrangement in which a brake circuit controls the coupling of motor windings to a power source during a braking mode.

FIG. 5 shows a schematic diagram of an alternative example of the motor arrangement 100 depicted in FIG. 1.

The motor arrangement 500 comprises a motor indicated generally at 301, and a control circuit, indicated generally at 503. The control circuit is configured to operate in a driving mode and a braking mode. The motor is depicted as a three-phase motor comprising three windings $305_{a,b,c}$. The windings are in a wye winding arrangement in this example. The motor further comprises motor inputs $307_{a,b,c}$ coupled to the windings. Specifically, in this example each winding has one of its ends coupled to a respective motor input $307_{a,b,c}$. The motor comprises a rotor (not shown) that is operable to rotate with respect to the stator (also not shown). The windings are capable of being mounted on one of the rotor and the stator for acting on the other of the rotor and stator.

The control circuit comprises a drive circuit 309 similar to the drive circuit of FIG. 3, and a brake circuit 509. The brake circuit comprises a brake-circuit power source 511 comprising a pair of terminals. In this example the brake-circuit power source is a voltage source and the terminals are in the form of a pair of supply rails $513_{a,b}$ separated by a supply voltage $V_1$. The brake-circuit power source is arranged in parallel with the power source 313 of the drive circuit. The brake circuit further comprises a plurality of additional switching elements $515_a$, $515_b$ and $515_c$ separate from the switching elements of the drive circuit. Each of the switching elements $515_{a,b,c}$ is arranged so as to be connected to one of the supply rails of the brake circuit and a respective motor input $307_{a,b,c}$ in order to selectively couple each motor input to one of the brake-circuit supply rails.

The brake circuit further comprises control logic 517. The control logic is configured to control the coupling of the motor windings to the brake-circuit power source when the control circuit operates in braking mode. The control logic is configured to provide control signals to the switching elements of the brake circuit to selectively couple each of the motor inputs to one of the supply rails of the brake-circuit power source. The control logic is coupled to a trigger circuit 519. The trigger circuit is configured to cause the control logic to output the control signals in response to a trigger. The trigger may be indicative of a fault (either in a component of the arrangement 500 or an external component not shown). The trigger may be detected exogenously of the motor, as will be explained in more detail below. The trigger circuit may be coupled to the drive circuit, as indicated by the dashed line 521.

When the control circuit is operating in driving mode, no control signals are output to the switching elements $515_{a,b,c}$ from the control logic. Without a control signal from the control logic, the switching elements are in an open configuration and the brake circuit is therefore decoupled from the motor 301. In drive mode the motor windings are therefore energised by the drive circuit under the control of the commutation circuit.

When the control circuit is operating in braking mode, control signals are output from control logic 517 to activate switching elements $515_{a,b,c}$ to cause a respective motor winding to be continually coupled to the brake-circuit power source 511. In this particular example, motor input $307_a$ is continually coupled to supply rail $513_a$ and motor inputs $307_{b,c}$ are continually coupled to supply rail $513_b$ when the control circuit is operating in braking mode. Thus in this example arrangement, the control logic controls switching elements of the braking circuit separate to those of the driving circuit in order to continually couple the motor windings to a power source when the control circuit is operating in braking mode. This is in contrast to the example arrangement shown in FIG. 3, where the control logic controls switching elements of the drive circuit to continually couple the motor windings to a power source during braking mode.

The control logic may be configured to output the control signals to the switching elements in response to receiving a signal from the trigger circuit 519. The trigger circuit itself may be configured to output the signal to the control logic in response to a trigger condition. The trigger condition could be the supply voltage provided by the power source of the drive circuit dropping below a predetermined value.

The brake circuit may optionally comprise additional switching elements $515_{d,e}$ (shown in dashed lines). Switching element $515_d$ is a low-side switching element and switching element $515_e$ is a high-side switching element. The control logic 517 may be configured to provide control signals to these switching elements along control lines (indicated by the dashed lines). Providing these additional switching elements can make the control circuit entirely single-fault tolerant in the event of a failure in one of the brake-circuit switching elements or one of the motor windings $305_{a,b,c}$ (provided the control logic itself is single-fault tolerant).

The control circuit may be configured so that in braking mode a selection or subset of the brake-circuit switching elements are activated by default and the remaining switching elements are not activated (that is are in an open configuration). The switching elements that are activated by default may be $515_{a,b,c}$ for example. The control logic may be configured to alter the subset of brake-circuit switching elements that are activated in response to one of the switching elements or motor windings undergoing failure to ensure that two of the motor windings remain coupled to the power source to form a closed current path.

For example if switching element $515_a$ were to fail, the control logic could respond by activating switching elements $515_{d,e}$ and de-activating switching element $515_b$. This switches the coupling of motor input $307_a$ from the upper power rail $513_a$ to the lower power rail $513_b$ and the coupling of motor input $307_b$ from the lower supply rail to the upper supply rail. Similarly, if motor winding $305_a$ were to fail, the control logic could respond by activating switching elements $515_{d,e}$ and de-activating switching elements $515_{a,b}$. Switching the coupling of the motor inputs in this manner ensures that at least two of the motor windings remain coupled to power source 511 to form a closed current path. This allows the braking of the motor to continue in the event of a single fault condition.

Figure 6:
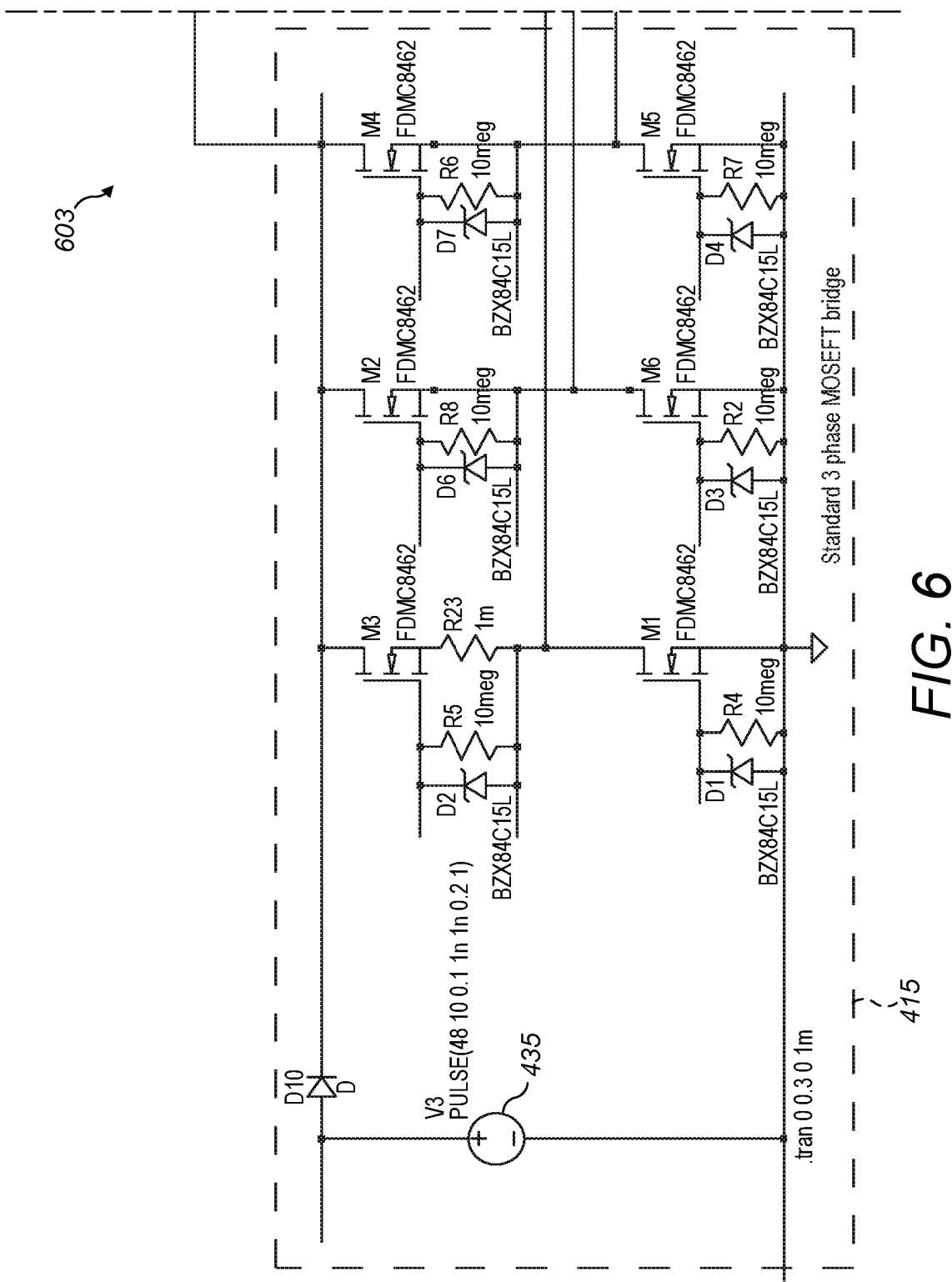
FIG. 6 shows a circuit diagram of a motor arrangement in which a brake circuit controls the coupling of motor windings to a power source during a braking mode.
Figure 6:
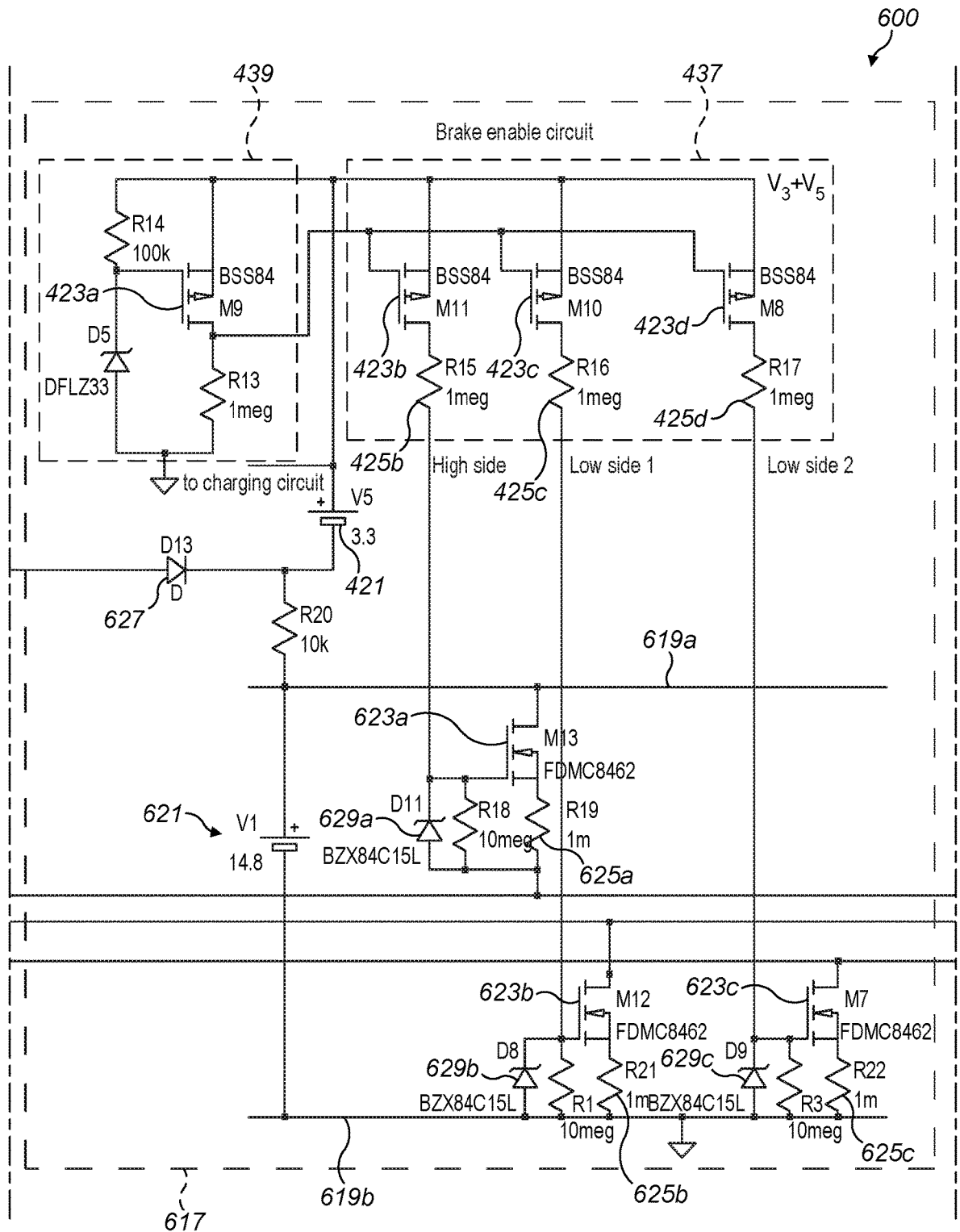
Figure 6:
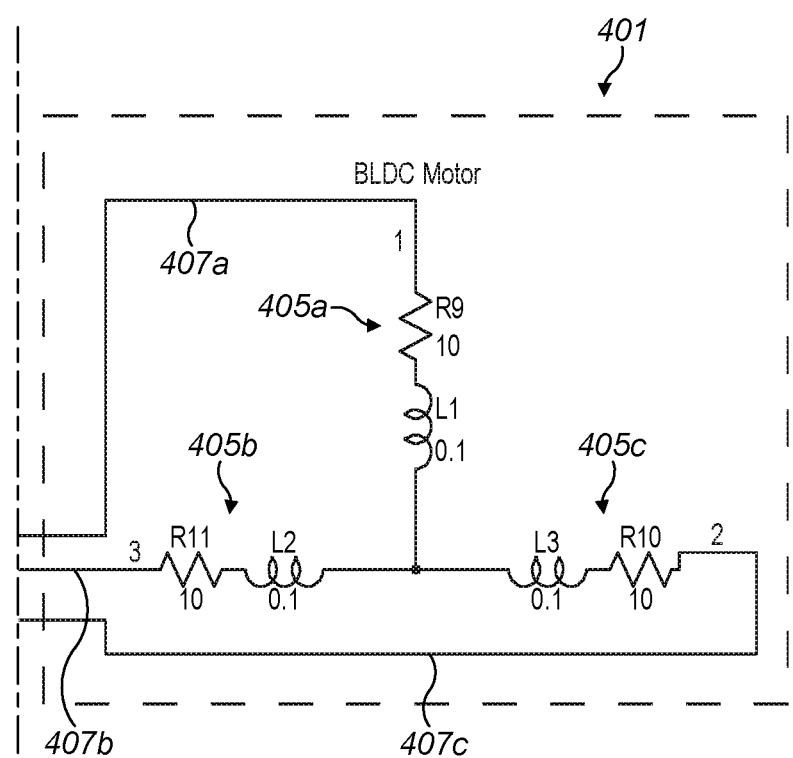

FIG. 6 shows an example implementation of the motor arrangement 500 depicted FIG. 5.

Shown in FIG. 6 is a motor arrangement 600 comprising a motor indicated generally at 401, and a control circuit, indicated generally at 603. The motor is depicted as a three-phase motor comprising three windings $405_{a,b,c}$. The windings are in a wye winding arrangement. This is for the purposes of illustration only. The motor comprises a rotor (not shown) that is operable to rotate with respect to the stator (also not shown). The windings are capable of being mounted on one of the rotor and the stator for acting on the other of the rotor and stator.

The control circuit comprises a drive circuit 415 similar to the drive circuit shown in FIG. 4, and a braking circuit 617. In contrast to the brake circuit shown in FIG. 4, the brake circuit 617 comprises a brake-circuit power source 621 comprising a pair of terminals. In this example the brake-circuit power source is a voltage source and the terminals are in the form of a pair of supply rails $619_{a,b}$ separated by a supply voltage $V_1$. The brake-circuit power source is arranged in parallel with the power source 435 of the drive circuit. The brake circuit comprises control logic, indicated generally at 437, and a trigger circuit, indicated generally at 439. The control logic 437 and trigger circuit 439 have been described with reference to FIG. 4 and so their description will not be repeated here.

The brake circuit further comprises three additional switching elements $623_a$, $623_b$ and $623_c$ separate from the switching elements of the drive circuit and connected to switching elements $423_{b,c,d}$ respectively of the control logic 437. Switching elements $623_{a,b,c}$ may be, for example FETs (e.g. N-MOSFETs as shown), bi-polar transistors, TRIACS, SCRS, IGBTs, SiC based devices etc. The switching elements are arranged so that the gates of elements $623_{a,b,c}$ are driven by a control line from the drains of switching elements $423_{b,c,d}$ respectively (via respective resistors $425_{b,c,d}$).

The switching elements $623_{a,b,c}$ are further arranged so as to be connected to one of the supply rails of the brake circuit $619_{a,b}$ and a respective motor input $407_{a,b,c}$ in order to selectively couple a motor input to one of the supply rails of the braking circuit. That is, the braking circuit comprises separate switching elements from the switching elements of the drive circuit for continually coupling the motor windings to a power source when the control circuit is in braking mode.

In the arrangement shown, the drain of element $623_a$ is connected to the upper supply rail $619_a$ and the source is connected to motor input $407_a$ via resistor $625_a$. The drain of element $623_b$ is connected to the motor input $407_b$ and the source connected to the lower rail $619_b$ via resistor $625_b$; and the drain of element $623_c$ is connected to the motor input $407_c$ and the source connected to the lower rail $619_b$ via resistor $625_c$. The gates of switching elements $623_{a,b,c}$ may optionally also be connected to Zener diodes $629_{a,b,c}$ as shown. The Zener diodes may not be required depending on the voltages of the implementation and the switching elements chosen.

The brake circuit further comprises a diode 627 between the upper rail of the drive circuit and the power source 421 of the brake circuit to prevent current leakage from the brake circuit to the drive circuit.

When the control circuit is in driving mode, switching element $423_a$ is closed and switching elements $423_{b,c,d}$ are open as in the example described with reference to FIG. 4. Consequently no voltage is applied to the gates of switching elements $623_{a,b,c}$ and thus each of these elements is in an open configuration thereby decoupling the brake circuit from the motor.

When the control circuit is in braking mode, each of switching elements $423_{b,c,d}$ adopts a closed configuration in response to element $423_a$ adopting an open configuration. This causes the switching elements $623_{a,b,c}$ to transition to a closed configuration because their gates are pulled high to the upper rail of the brake circuit at potential $V_3+V_5$. The motor inputs are thereby coupled to one of the supply rails $619_{a,b}$ of the brake circuit to cause a plurality of windings of the motor to be continually coupled to the power source of the brake circuit.

The control circuit may be configured to switch from the driving mode to the braking mode in response to a trigger condition. The trigger condition may be detected by the trigger circuit 439. The trigger condition may be indicative of a fault. That fault may be exogenous to the motor, e.g. it may be a fault in the drive-circuit supply voltage. In response to the trigger condition, the trigger circuit 439 may cause the control logic 437 to activate selected switching elements of the brake circuit to induce braking of the motor in an analogous manner to that described above with reference to FIG. 4.

The motor arrangement of FIG. 6 may be used to induce braking of the rotor relative to the stator even under single fault conditions. A single fault condition could be, for example, a power failure of a winding. The circuit is resistant to a winding failure because in braking mode, each winding of the motor is continually coupled to a voltage source to form a closed current path. It can be seen with reference to FIG. 6 that when the control circuit is in braking mode current is applied between one of the motor inputs ($407_a$) and two of the other motor inputs ($407_b$ and $407_c$). A failure of winding $405_b$ permits the braking of the motor to be continued since current can still continually supplied between input $407_a$ and $407_c$. Similarly a failure of winding $405_c$ permits braking of the motor to be continued since current can still be applied between input $407_a$ and $407_b$.

Figure 7:
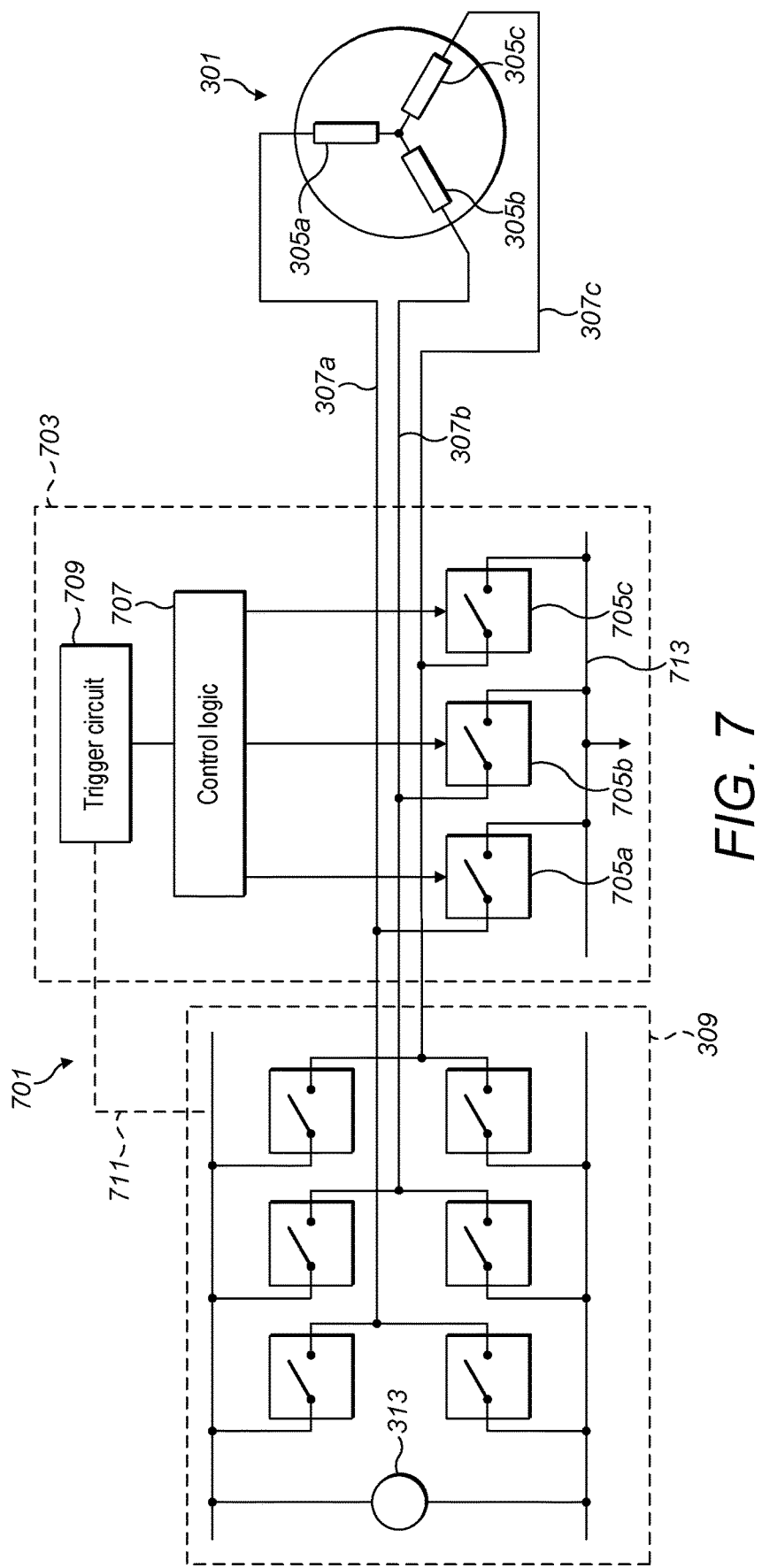
FIG. 7 shows an alternative schematic diagram of a motor arrangement in which a brake circuit controls the coupling of motor windings to a power source during a braking mode.

FIG. 7 shows a schematic diagram of a further example of the motor arrangement 100 depicted in FIG. 1.

Shown in FIG. 7 is a motor arrangement 700 comprising a motor, indicated generally at 301, and a control circuit, indicated generally at 701. The control circuit comprises a drive circuit 309 and a brake circuit 703. The control circuit is configured to operate in a braking mode and a driving mode, described in more detail below. The motor arrangement and drive circuit are as shown in FIG. 5 and so a description of their structure and arrangement will not be repeated here.

The brake circuit comprises a plurality of switching elements $705_{a,b,c}$ separate from the switching elements of the drive circuit. Each of the switching elements is coupled to a respective motor input $307_{a,b,c}$ and to a common rail 713 that may be connected to ground. The set of switching elements are operable to couple the motor inputs to ground. In the example shown here, each switching element is configured to couple a respective motor input to the common rail 713 when the control circuit is in braking mode.

The brake circuit further comprises control logic 707 and a trigger circuit 709 coupled to the control logic. The control logic is configured to output control signals to activate the switching elements $705_{a,b,c}$ when the control circuit is in braking mode to thereby couple each motor input to the common rail. The control logic may output the control signals to cause the control circuit to switch from the driving mode to the braking mode.

The control logic may be configured to output the control signals in response to a signal from the trigger circuit. The trigger circuit itself may output the signal to the control logic in response to a trigger condition. The trigger may be indicative of a fault condition. That fault condition may be exogenous of the motor, as explained in more detail below. The trigger may be exogenous of the motor so that the detection of the fault indication occurs externally of the motor (e.g. by sensing a component not forming part of the motor arrangement). The trigger circuit may optionally be coupled to the drive circuit, as indicated by the dashed line 711.

The brake circuit may comprise its own voltage supply (not shown) for powering the control logic to generate the control signals to activate the switching elements $705_{a,b,c}$. This power supply can be independent of the drive-circuit power source to enable the control circuit to engage the brake circuit to transition to braking mode independently of the operation of the drive-circuit power source (for example in the event of the exogenous fault condition that the drive-circuit power source fails).

When the control circuit is in driving mode, each of the switching elements is deactivated, or in an open position. Thus when the control circuit is in driving mode, the brake circuit is disengaged and decoupled from the motor 301 and the motor windings are energised by the drive circuit under the control of the commutation circuit (not shown).

When the control circuit is in braking mode, the control logic outputs control signals to activate switching elements $705_{a,b,c}$ to continually directly connect each motor input to the common rail 713 to decouple the drive circuit from the motor. Closing each switching element in this manner causes each motor winding to be continually connected to the other motor windings thus forming a closed current path via the common rail to induce braking of the rotor relative to the stator. This arrangement is entirely single fault tolerant in the event that one of the switching elements $705_{a,b,c}$ fails. This is because if any one of the brake-circuit switching elements fails, a closed current path will remain between two of the motor windings and the common rail.

The motor arrangement 701 is also single fault tolerant in the event that one of the motor windings $305_{a,b,c}$ fails. A failure of any one of the windings still permits braking of the motor to be continued because a closed current path can still be formed between the remaining functional windings and the common rail. For example, if winding $305_a$ fails, a closed current path is formed between windings $305_{b,c}$, switching elements $705_{b,c}$ and common rail 713. It will be appreciated a closed current path will similarly be formed if either of windings $305_{b,c}$ fail (and $305_a$ does not).

The motor windings are directly connected to the common rail by means of switching elements $705_{a,b,c}$. When the rotor rotates relative to the stator, a back EMF is induced which causes a current to flow through the motor windings $305_{a,b,c}$ and the switching elements $705_{a,b,c}$. The torque generate by this current flow will retard motion of the motor. The switching elements may connect the motor inputs directly to the common rail. That is, there may be no substantial resistance on the circuit path between the motor windings and the common rail. There may be no intervening circuitry components between the motor inputs and the common rail. The motor inputs may be connected to the common rail without an intervening resistor between the switching elements and the common rail, for example. The electrical energy generated during braking can be dissipated using only the resistance of the windings. This is advantageous because it reduces the number of required components in the circuit.

The control circuit may be configured to transition from driving mode to braking mode in response to a trigger. The trigger may be detected by the triggering circuit. The trigger could be indicative of a fault condition exogenous to the motor, for example the voltage supplied by the drive-circuit power source 313 dropping below a predetermined value. Alternatively the fault condition may not be exogenous to the motor, but the trigger is (e.g., a fault in a motor component is detected by monitoring a parameter of a component external to the motor). The trigger circuit may be coupled to the drive circuit (as shown) in order to detect this fault condition.

Of course, the trigger circuit may be configured to detect a number of other fault conditions. Each of these fault conditions may be detected exogenously to the motor. That is, the fault may be detected from monitoring a component that is external to the motor (e.g. is not part of the rotor, stator or windings). The fault itself may be exogenous to the motor, meaning an exogenous fault condition may reside in any component not constituting the motor. The fault condition may therefore be independent of the working condition of the motor components (such as the rotor, stator and windings).

The trigger could indicate a fault condition such as, for example, loss of power to the motor arrangement (e.g. the drive-circuit power source), incorrect voltage supply provided by the drive circuit (e.g. voltage too high, too low, or containing too much noise/ripple); a winding failure in the motor; electronic component failure (e.g. in one of the drive-circuit switching elements or in the commutation circuit) etc.

As has been described above, the motor arrangements described herein may form part of a robotic system (e.g. to drive the joints of the robot arm). The trigger circuit may be configured to detect a trigger indicative of a fault condition in any of the components of the robot arm (i.e. components that are exogenous to the motor arrangement within the arm). For example, the fault condition may be a software failure in the control system (e.g. the control system that controls the movement of the robot arm in response to movement of user input controllers); a failure in control electronics within the robot arm; a communication failure (e.g. a loss or corruption of data, such as state data defining the pose of the arm, or control data received from the input controllers). Alternatively, the fault condition could be unexpected movement of the robotic arm such as a movement non-commensurate with the movement of the input controllers (e.g. too little movement, too much, no movement at all, an uncommanded movement etc.); thermal conditions (e.g. the electronics or other part of the robot arm become too hot, or have a temperature that is increasing above a certain threshold rate of change). The fault condition could be an atmospheric condition within the operating theatre in which the surgical robot is placed (e.g. the theatre is too bright, or too dark)—the robot may have an optical sensor coupled to the trigger circuit to detect this condition. In other examples the fault condition could be a fault in one or more sensors of the robot system (e.g. position sensors, joint torque sensors etc.). The fault condition could be a failure in one or more computer memories of the robotic system, or the sensing of unexpected mechanical forces or joint torques. Each of these fault conditions may be detected externally of the motor. A trigger in the form of a signal (or absence of a signal, as will be described below), may be generated in response to detecting each of these fault conditions.

In other examples, the trigger may be the detection of an acoustic condition (e.g. detection of an unwanted noise within the robot arm such as clicking, grinding or crunching that may be indicative of a fault), or the trigger may be a signal (or the absence of a signal) generated in response to detecting the acoustic condition. The trigger may be the detection of an unexpected orientation of the robot arm (e.g. an orientation indicating the robot is not securely in place, or is toppling). The trigger may be surgical-procedure specific (e.g. the detection of a user command inconsistent with best practice or outside of defined parameters).

Thus the motor arrangement shown in FIG. 7 (and indeed FIGS. 3 to 6) can be configured to enter the braking mode in response to exogenous triggers indicative of a variety of fault conditions.

The trigger circuit may comprise, or otherwise be coupled to, a switch configured to output a signal that indicates that no fault condition exists (or has been detected). The switch may be referred to as a dead-man's switch. The dead-man's switch may be part of the motor arrangement or external to the motor arrangement. At times when the switch outputs a signal, the trigger circuit interprets this as a lack of a trigger (i.e. the trigger circuit takes no action and does not cause the control circuit to switch from driving mode to braking mode). In response to the detection of a fault condition, a signal ceases to be produced by the switch. The trigger circuit detects the absence of the signal and interprets this as a trigger to switch the control circuit to braking mode.

In other words, the trigger is the absence of a signal indicating that no fault conditions exist. The signal may be referred to as a heartbeat. Thus in this case the trigger circuit does not cause the control circuit to switch to braking mode in response to detecting a sensed signal, but rather causes the control circuit to switch to braking mode in response to detecting the absence of a signal.

Figure 10:
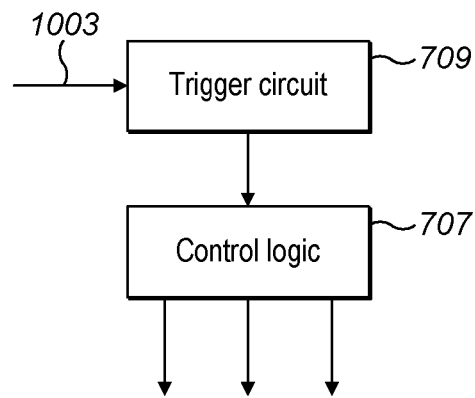
FIG. 10 shows an example of how the trigger circuit detects absence of a signal as the trigger to activate the braking circuit.

An example of how a dead-man's switch may be implemented is shown in FIG. 10. Here, the remaining parts of the motor arrangement 700 except for the trigger circuit 709 and control logic 707 have been omitted for the purposes of clarity. The trigger circuit is shown receiving a signal 1003. The signal 1003 indicates that no fault condition exists. This signal may as such be referred to as a negative-event signal (i.e. the presence of the signal indicates the lack of a fault event in the system or robot arm). The signal may be generated by an external component of the system (e.g. a sensor on the robot arm, such as a joint-torque sensor, thermal sensor etc.). In another example, the control system (e.g. the control system of the robot arm) periodically sends a regular instruction set from memory (e.g. every 20 microseconds) for execution. The control system may include within that instruction set an indication (e.g. a signal) that it is functioning correctly, that is, no faults have been detected. This signal may also be referred to as a heartbeat. The trigger circuit may be arranged to receive the heartbeat and to trigger braking by causing the control circuit to switch to braking mode if the heartbeat is not received.

The trigger circuit is configured to be idle at all times it is receiving the negative-event signal (e.g. the heartbeat), i.e. at these times the trigger circuit does not output any signals to the control logic 707. It is further configured to interpret the absence of signal 1003 as a trigger and in response to cause the control circuit to switch to braking mode.

For example, the sensor may be a voltage sensor for measuring the voltage of the drive-circuit. At times when the voltage is above a threshold, the sensor outputs signal 1003 to the trigger circuit indicating that no fault condition in the supply voltage exists, and thus the trigger circuit is idle (i.e. the control circuit is not switched to braking mode). If the voltage drops below the threshold, the sensor does not output signal 1003. The trigger circuit interprets the absence of signal 1003 as a trigger and in response causes the control circuit to switch to braking mode.

In another example, the trigger circuit may be configured to receive a plurality of signals from respective sensors, each signal indicating a lack of fault condition in a respective part of the system. The trigger circuit may be configured to be idle on the condition that each of the plurality of heartbeats are received; if at least one heartbeat is absent, the trigger circuit interprets this as a trigger and causes the control circuit to switch to the braking mode.

Figure 11:
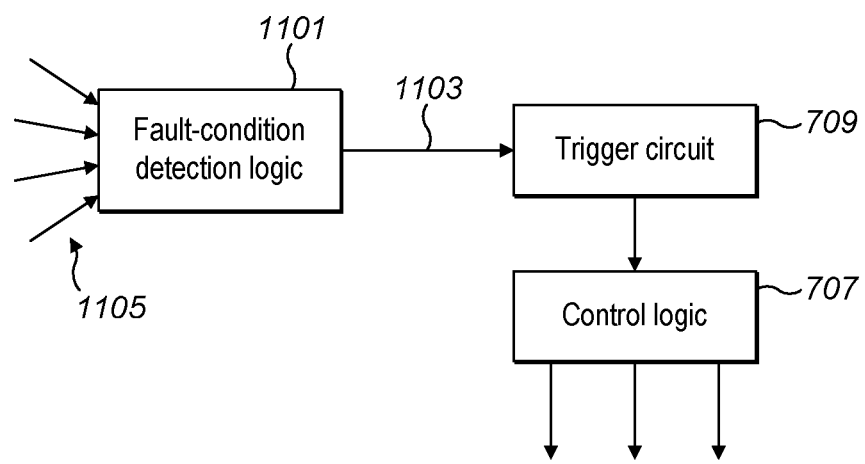
FIG. 11 shows an example of how the trigger circuit can detect a trigger exogenous to the motor indicative of one of a plurality of fault conditions.

A further arrangement for detecting a trigger exogenous to the motor is shown in FIG. 11. Here, the trigger circuit is coupled to fault-condition detection logic 1101. The detection logic may be configured to generate a signal 1103 indicating no fault conditions exist (i.e. it may generate a heartbeat signal). This signal may also be referred to as a negative-event signal (i.e. the presence of the signal indicates the lack of a fault event in the system or robot arm). The trigger circuit is configured to be idle at all times it is receiving the negative-event signal, i.e. at these times the trigger circuit does not output any signals to the control logic 707. It is further configured to interpret the absence of signal 1103 as a trigger and in response to cause the control circuit to switch to braking mode.

The detection logic 1101 may comprise circuitry to determine whether a fault condition has been detected. The detection logic may be configured to output signal 1103 by default when no fault condition has been detected, and to prevent the signal 1103 from being passed to the trigger circuit upon the condition that a fault condition has been detected.

The detection logic 1101 may be configured to receive a plurality of input signals, indicated generally at 1105. Each input may either indicate the detection of a respective fault condition, or an indication that a respective fault has not been detected. For example, the detection logic may be coupled to thermal sensors (to detect thermal conditions); voltage sensors in the driver-circuit; joint-torque sensors etc. If the inputs indicate the detection of a fault condition, then the logic 1101 may be configured to cease output of signal 1103 in response to receiving at least one input.

If the inputs 1105 indicate a lack of fault condition, the control logic 1103 may be configured to cease output of signal 1103 in response to at least one of the input signals being absent.

Advantageously, the arrangement of FIG. 11 allows a fault detected by any one of a plurality of sensors to cause the detection logic prevent the signal 1003 from being communicated to the trigger circuit. That is, any one of a number of fault conditions can be the trigger to activate the braking circuit. This is particularly convenient if the braking function of the motor arrangement is being used as a safety feature because it enables many types of potentially hazardous events to be detected using sensors exogenous to the motor.

Configuring the system so that the trigger is the absence of a signal is particularly convenient when the braking mode of the motor arrangement is implemented as a safety feature within a system. This is because requiring the detection of a signal to be the trigger suffers from the drawback that a fault in the sensed signal renders the braking mode of the motor arrangement ineffective, whereas a system in which the absence of a signal is the trigger does not suffer from this problem.

By arranging the motor arrangement so that the trigger (e.g. the detection of a fault) is exogenous to the motor, the motor arrangement can be arranged to switch from driving mode to braking mode under a variety of potential fault conditions rather than being limited to faults in the motor components (which may represent only a small subset of the possible faults within a larger system in which the motor arrangement is implemented, such as a robot arm). It may be a convenient arrangement for systems in which there are multiple motors because all the motors can be braked relatively easily without having to instruct each individual motor.

Figure 8:
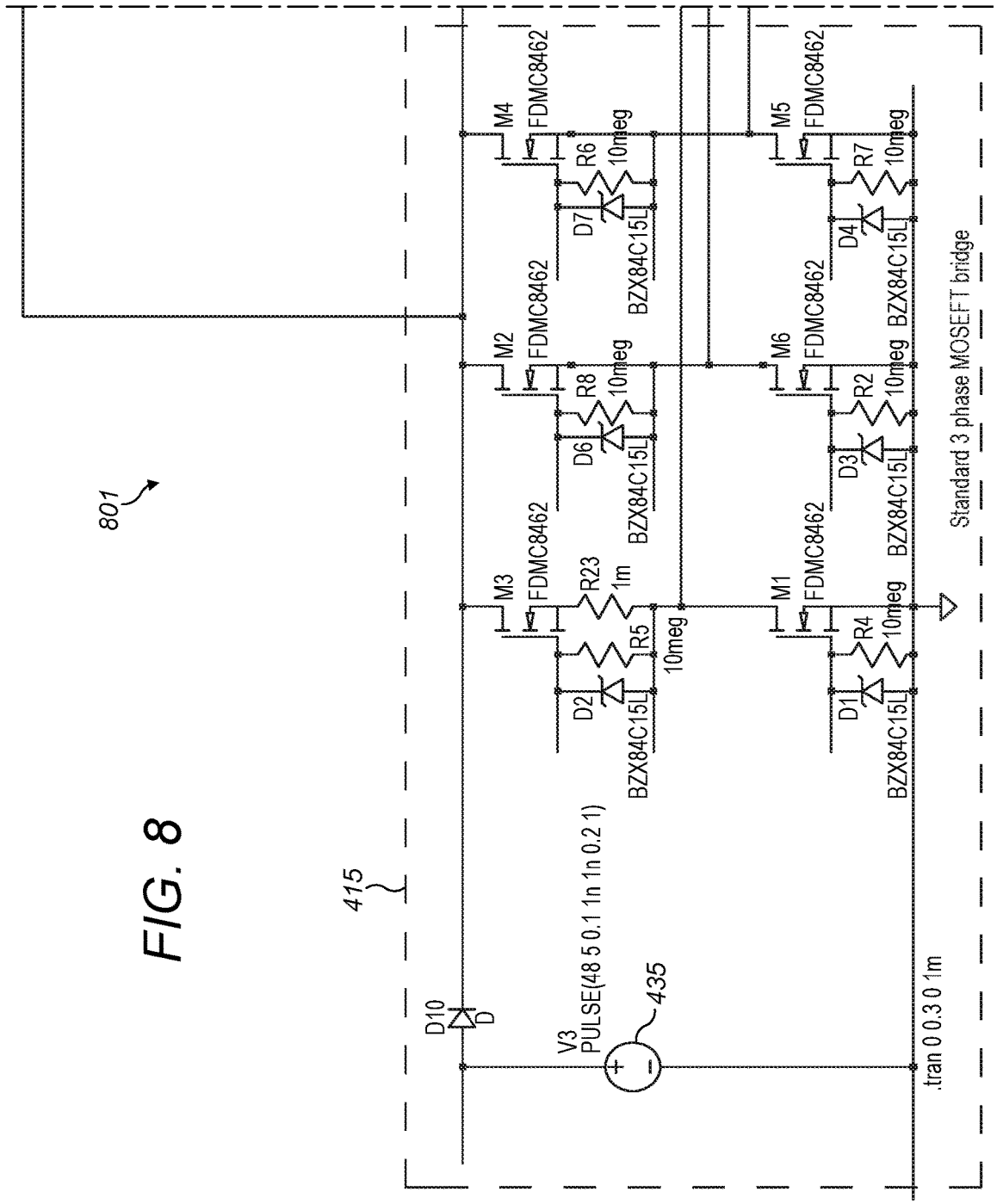
FIG. 8 shows an alternative circuit diagram of a motor arrangement in which a brake circuit controls the coupling of motor windings to a power source during a braking mode.
Figure 8:
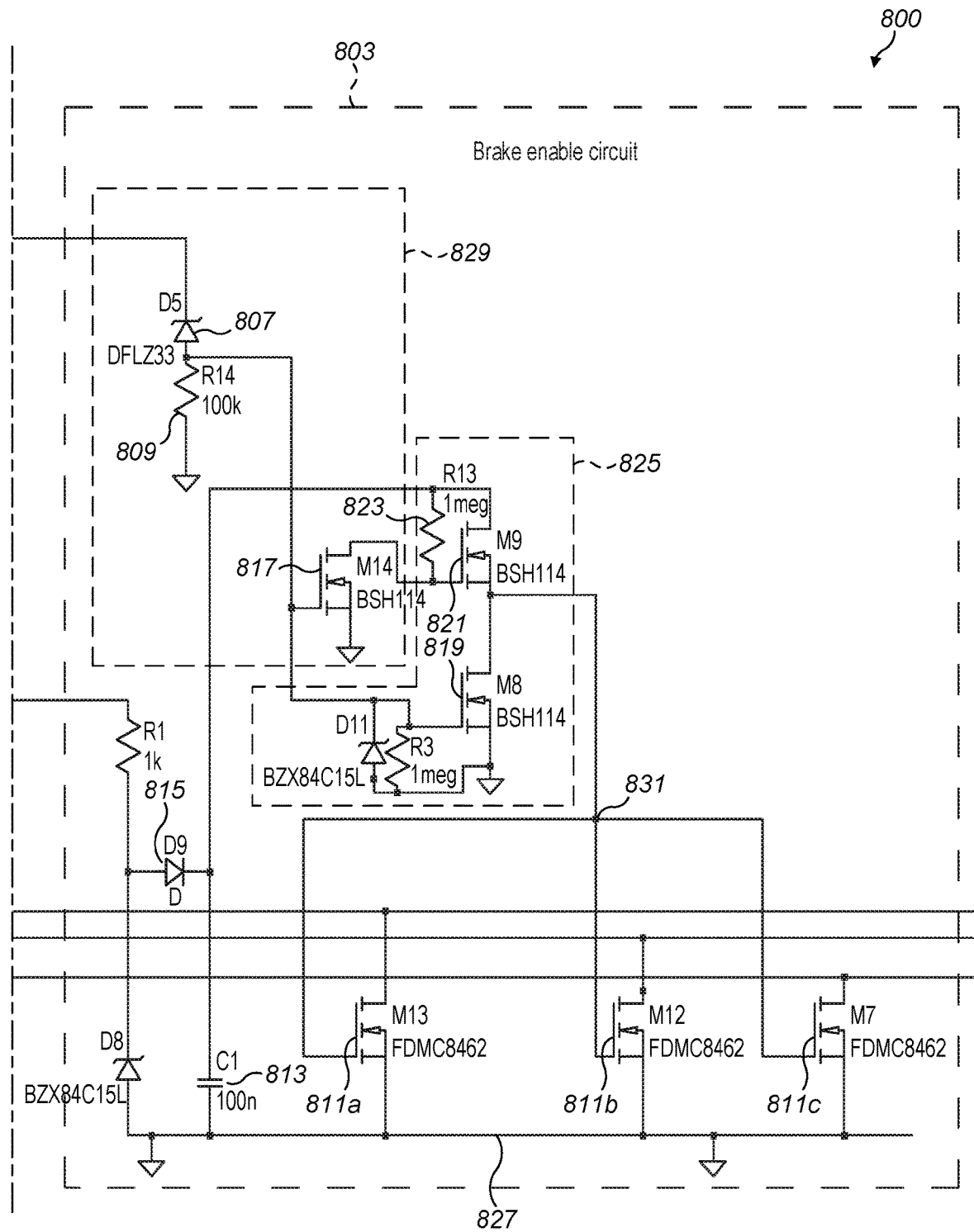
Figure 8:
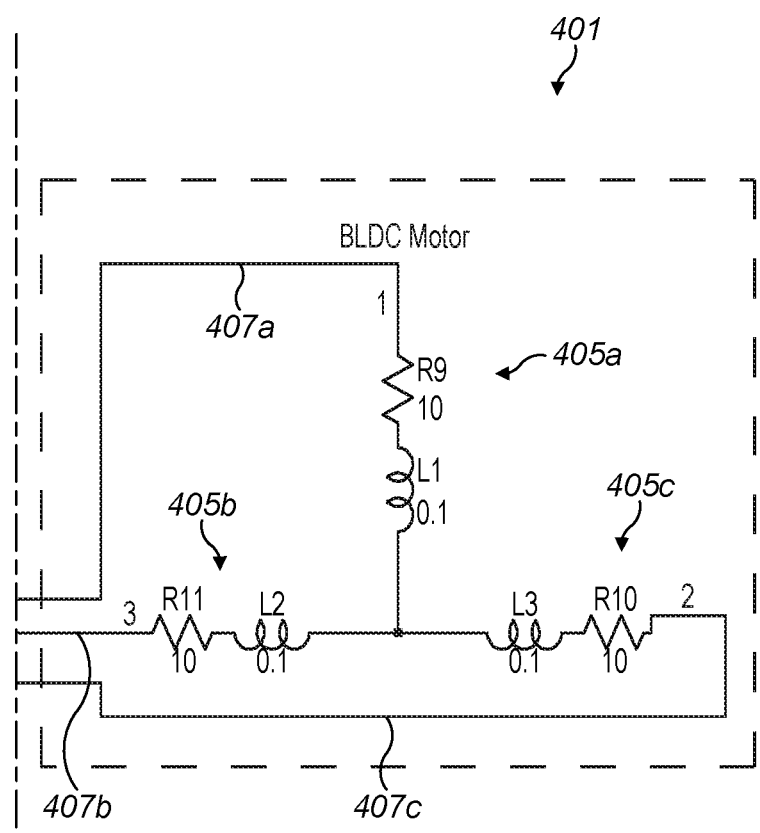

FIG. 8 shows an example implementation of the motor arrangement 700 depicted in FIG. 7.

Shown in FIG. 8 is a motor arrangement 800 comprising a motor indicated generally at 401, and a control circuit, indicated generally at 801. The control circuit comprises a brake circuit 803 and a drive circuit 415. The motor 401 is as shown in FIGS. 4 and 6 and the drive circuit 415 is as shown in FIG. 4 and so a description of their structure and arrangement will not be repeated here. The control circuit is configured to operate in a driving mode and a braking mode.

The brake circuit comprises control logic, indicated generally at 825, and a triggering circuit, indicated generally at 829. The brake circuit additionally comprises three switching elements $811_{a,b,c}$ each connected between a common lower rail 827 and a respective motor input $407_{a,b,c}$. The switching elements may for example be FETs (e.g. N-MOS-FETs as shown). Alternatively they may be bi-polar transistors, TRIACS, SCRS, IGBTs, SiC based devices etc. The switching elements $811_{a,b,c}$ are arranged so that the drains are connected to respective motor inputs $407_{a,b,c}$ and the sources are connected to a common lower rail 827. The common lower rail may be connected to ground, as shown. The switching elements are configured so that each of the motor inputs is connected directly to the common lower rail when the control circuit is operating in braking mode.

The trigger circuit comprises a Zener diode 807 and a resistor 809. The diode is connected at one of its inputs to the upper rail of the drive circuit and connected to ground at its other end via resistor 809. The trigger circuit further comprises a switching element 817. The gate of switching element 817 is driven by a control line from a node situated between the Zener diode 807 and resistor 809, and its source is connected to ground.

The control logic 825 comprises a plurality of switching elements 821 and 819. It may additionally comprise a resistor 823. The source of element 821 is connected to the drain of element 819. The gate of element 821 is driven from the drain of switching element 817. The source of element 819 is connected to ground and its gate is driven from the node situated between the Zener diode 807 and resistor 809. The drain of switching element 821 is coupled to a capacitor 813. The resistor 823 is connected between the control line that couples the drain of element 821 to the capacitor, and the control line that couples the drain of element 817 to the gate of element 821. The gates of switching elements $811_{a,b,c}$ are driven from a node 831 situated between the source of element 821 and the drain of element 819.

The capacitor 813 is electrically coupled to the upper rail of the drive circuit 415 via a diode 815 so as to permit voltage to be applied across the capacitor from the upper rail but to prevent built-up charge from leaking back from the capacitor to the upper rail. The motor arrangement is configured to cause the capacitor to be charged by the power source of the drive circuit 435 when the control circuit is operating in braking mode.

The control logic is configured to activate switching elements $811_{a,b,c}$ to thereby directly connect a plurality of motor inputs to the common rail 827 when the control circuit is in braking mode. Directly connecting a plurality of motor inputs to the common rail 827 causes a plurality of motor windings to be coupled to themselves forming a closed current path to induce braking of the motor. The control logic may activate the switching elements 811 under the control of the trigger circuit in response to a trigger condition. This is explained in more detail below.

When the control circuit is in drive mode current flows through diode 815 causing a voltage to be provided across the capacitor 813 from the upper supply rail of the drive circuit, which charges the capacitor. Current flows through the Zener diode 807 which pulls the gate of switching element 817 high causing it to adopt a closed configuration. The gate of switching element is pulled high by the upper rail of the drive-circuit power source. This in turn means the gate of switching element 821 is pulled low to ground and so adopts an open configuration. The gate of switching element 819 is pulled high through diode 807 and so is activated to a closed position. Activating switching element 819 pulls each of the switching elements $811_{a,b,c}$ to ground. Switching elements $811_{a,b,c}$ therefore adopt an configuration to thereby decouple the brake circuit from the motor.

The control circuit may be configured to enter braking mode when the supply voltage $V_3$ of the drive circuit drops below a predetermined value. The control logic is configured to activate switching elements $811_{a,b,c}$ when in braking mode to connect each motor input to ground, as explained below.

When supply voltage of the drive-circuit power source drops below the predetermined value, current no longer flows though diode 807. This in turn causes the gate of switching elements 817 and 819 to be pulled to ground which opens these switches. The gate of switching element 821 is driven by the discharging capacitor 813 via resistor 823. The discharging capacitor activates switching element 821 which in turn causes the gates of each of capacitors $811_{a,b,c}$ to be driven by the capacitor and causing these switching elements to be activated.

When selected switching elements $811_{a,b,c}$ are activated each of the motor inputs is directly connected to common lower rail 827. Each of the motor windings is then continually coupled to each other to form a closed current loop to thereby induce braking of the rotor relative to the stator. As shown, the motor inputs can be connected directly to ground without the requirement of a resistor. The inventor has found that the motor arrangement can dissipate electrical energy generated during braking of the rotor using only the resistance of the windings. This may negate the requirement of a dump resistor, for example between the switching elements $811_{a,b,c}$ and ground. This may lead to a reduction in complexity and component costs during manufacture of the motor arrangement.

The arrangement shown in FIG. 8 uses the charge of the capacitor to activate the switching elements of the brake circuit which advantageously negates the requirement of a battery within the braking circuit. The time that the capacitor can be hold the gates of the switching elements $811_{a,b,c}$ closed can be increased arbitrarily by increasing the capacitance.

Embodiments of the present invention can enable a motor arrangement to operate in a braking mode without the requirement of a separate brake in the drive train. In addition, the braking function can be enabled by adding a brake circuit to interface with a standard three-phase bridge and with the use of a standard electrically commutating motor leading to a potential reduction in implementation cost. The brake circuit may control the switching elements of the three-phase bridge to implement the braking function or the brake circuit may comprise separate dedicated switching elements to perform this function.

Furthermore, motor arrangements according to embodiments of the present invention can dissipate electrical energy generated during braking of the rotor using only the resistance of the windings, which negates the requirement of a dump resistor. This may lead to a further reduction in complexity and component costs.

The present description has described examples in which the switching elements are N-MOSFETs and P-MOSFETs. It will be appreciated that this was for the purpose of illustration only and that alternative implementations are possible in which N-MOSFETs may be replaced by P-MOSFETs and vice versa. As has been mentioned previously, the switching elements are not limited to MOSFETS but may be any suitable switching element.

In some of the examples described herein the control circuit was configured to switch to the braking mode upon a triggering condition whereby the supply voltage drops below a predetermined value. It will be appreciated that other trigger conditions are possible by adding additional logic elements or discrete transistors. The mechanism for detecting the trigger condition could be configured in any suitable way. Various examples of triggers and fault conditions have been described herein. These may be applied to any of the described motor arrangements, e.g. the motor arrangements shown in FIGS. 3 to 8. Any of the motor arrangements described herein may comprise a trigger circuit for switching the control circuit from driving mode to braking mode in response to a trigger. That trigger may be the absence of a heartbeat. The heartbeat may be generated by one or more components of the system. The heartbeat signal may be periodic (i.e. communicated periodically), and may be deemed absent if not received by the trigger circuit within a predetermined amount of time, i.e. if the time between successive heartbeats exceeds a threshold value.

The embodiments described herein have been described with reference to examples in which the motor is a three-phase motor. The windings of the three-phase motor could be in a wye or delta arrangement, for example. It is to be understood other types of motor are equally applicable to the present invention. The motor could be, for example, a polyphase motor with more than three windings or a bi-phase motor.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A robotic system comprising:
a robot arm comprising a series of links interconnected by articulated joints; and
a motor arrangement for driving at least one of the articulated joints, the motor arrangement comprising:
a motor having a rotor, a stator, and at least three windings mounted on one of the rotor and the stator for acting on the other of the rotor and the stator, and a plurality of inputs coupled to the windings; and
a control circuit which includes a power source including a pair of terminals and a series of voltage-controlled switching elements arranged to selectively couple each motor input to one of the terminals;
the control circuit being configured to:
operate only in either a driving mode in which it dynamically energizes the windings via the motor inputs so as to cause the rotor to rotate relative to the stator or a braking mode in which it continually connects the at least three windings to a common rail to form a closed current path, the braking mode inducing braking of the rotor relative to the stator to arrest motion of the rotor and to prevent rotation of the rotor against an external torque;
switch directly from the driving mode to the braking mode in response to a supply voltage of the control circuit dropping below a predetermined value; and
when in the driving mode, dynamically energize the windings by activating the switching elements to couple each motor input to a selected one of the terminals.

2. The robotic system as claimed in claim 1, wherein the control circuit comprises:
a drive circuit configured to dynamically energize the windings so as to cause the rotor to rotate relative to the stator when the control circuit is in the driving mode.

3. The robotic system as claimed in claim 2, wherein
the power source comprises a pair of terminals and
the series of voltage-controlled switching elements arranged to selectively couple each motor input to one of the terminals are components of the drive circuit, and the drive circuit also includes
a commutation circuit configured to, when the control circuit is in driving mode, dynamically energize the windings by activating the switching elements to couple each motor input to a selected one of the terminals.

4. The robotic system as claimed in claim 1, wherein the control circuit comprises a drive circuit configured to dynamically energize the plurality of windings so as to cause the rotor to rotate relative to the stator when the control circuit is in driving mode, the drive circuit comprising a three-phase MOSFET bridge.

5. The robotic system as claimed in claim 1, wherein the system comprises a trigger circuit configured to cause the control circuit to enter the braking mode when the supply voltage of the control circuit drops below the predetermined value.

6. The robotic system as claimed in claim 5, wherein the trigger circuit comprises a Zener diode coupled to a terminal of a drive-circuit power source, the Zener diode having an associated breakdown voltage, wherein the trigger circuit is configured to cause the control circuit to enter the braking mode of operation when the supply voltage drops below a predetermined voltage so that a voltage across the Zener diode is less than its breakdown voltage.

7. The robotic system as claimed in claim 1, wherein the supply voltage of the control circuit dropping below a predetermined value is detected exogenously of the motor.

8. The robotic system as claimed in claim 7, wherein the trigger circuit is configured to activate the brake circuit to cause the control circuit to enter the braking mode in response to the supply voltage of the control circuit dropping below the predetermined value which is a trigger indicative of a fault condition.

9. The robotic system as claimed in claim 8, wherein the trigger circuit is operable to receive a heartbeat signal indicating a lack of fault condition detection, and configured to interpret the absence of the heartbeat signal as the trigger.

10. The robotic system as claimed in claim 8, wherein the trigger circuit is operable to receive a plurality of heartbeat signals indicating the lack of a respective fault condition, and to interpret the absence of at least one of the heartbeat signals as the trigger.

11. The robotic system as claimed in claim 8, wherein the fault condition is exogenous to the motor.

12. The robotic system as claimed in claim 8, wherein the fault condition is a fault in one of the motor components.

13. The robotic system as claimed in claim 8, wherein the trigger is the absence of a signal indicative of a lack of fault condition.

14. The robotic system as claimed in claim 1, wherein the control circuit comprises a brake circuit configured to be activated when the control circuit is operating in the braking mode to cause the at least three windings to be continually connected to the common rail, and further configured to be deactivated when the control circuit is operating in the driving mode so as to be decoupled from the motor.

15. The robotic system as claimed in claim 14, wherein the brake circuit comprises a plurality of voltage-controlled switching elements arranged to connect a respective winding to the common rail when the brake circuit is activated.

16. The robotic system as claimed in claim 15, wherein the brake circuit further comprises a voltage supply that activates the switching elements to continually connect a respective winding to the common rail when the control circuit is in braking mode.

17. The robotic system as claimed in claim 16, wherein the voltage supply is a capacitor.

18. The robotic system as claimed in claim 17, wherein the capacitor is coupled to the drive circuit and the voltage-controlled switching elements of the brake circuit so that the drive circuit charges the capacitor when the control circuit is in driving mode and the capacitor discharges to activate the switching elements of the braking circuit when the control circuit is in braking mode.

19. The robotic system as claimed in claim 15, wherein the voltage controlled switching elements are MOSFETs.

20. The robotic system as claimed in claim 14, wherein the brake circuit comprises a plurality of voltage-controlled switching elements arranged to connect a respective winding to the common rail when the brake circuit is activated, and the voltage-controlled switching elements of the brake circuit are separate from the voltage-controlled switching elements of the control circuit arranged to selectively couple each motor input to one of the terminals.

21. A robotic system comprising:
a robot arm comprising a series of links interconnected by articulated joints; and
a motor arrangement for driving at least one of the articulated joints, the motor arrangement comprising:
a motor having a rotor, a stator, and at least three windings mounted on one of the rotor and the stator for acting on the other of the rotor and the stator, each winding having one of its ends coupled to a respective motor input;
a control circuit which includes a power source including a pair of terminals and a series of voltage-controlled switching elements arranged to selectively couple each motor input to one of the terminals,
the control circuit being configured to:
operate only in either a driving mode in which it dynamically energizes the windings via the motor inputs so as to cause the rotor to rotate relative to the stator or a braking mode in which it continually couples the at least three windings to a power source to form a closed current path that includes the power source and the at least three windings, the braking mode inducing braking of the rotor relative to the stator to arrest motion of the rotor and to prevent rotation of the rotor against an external torque;
switch directly from the driving mode to the braking mode in response to a supply voltage of the control circuit dropping below a predetermined value; and
when in the driving mode, dynamically energize the windings by activating the switching elements to couple each motor input to a selected one of the terminals.

* * * * *